United States Patent
Kim

(10) Patent No.: US 11,877,194 B2
(45) Date of Patent: Jan. 16, 2024

(54) METHOD AND APPARATUS FOR PERFORMING HANDOVER IN A WIRELESS COMMUNICATION SYSTEM

(71) Applicant: LG ELECTRONICS INC., Seoul (KR)

(72) Inventor: Soojin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 52 days.

(21) Appl. No.: 17/669,229

(22) Filed: Feb. 10, 2022

(65) Prior Publication Data

US 2023/0254739 A1    Aug. 10, 2023

(51) Int. Cl.
| | | |
|---|---|---|
| *H04W 36/00* | (2009.01) | |
| *H04L 1/00* | (2006.01) | |
| *H04L 5/14* | (2006.01) | |
| *H04W 56/00* | (2009.01) | |

(52) U.S. Cl.
CPC ....... *H04W 36/0069* (2018.08); *H04L 1/0025* (2013.01); *H04L 5/14* (2013.01); *H04W 36/0061* (2013.01); *H04W 56/001* (2013.01)

(58) Field of Classification Search
CPC ......... H04W 36/0055; H04W 36/0069; H04W 36/00692; H04W 36/00695; H04W 36/00698; H04W 36/0058; H04W 36/0061; H04W 36/0064; H04W 36/0066; H04W 36/12; H04W 36/125; H04W 72/0446; H04W 72/0453; H04W 76/15; H04W 76/16; H04W 76/19; H04W 56/001; H04L 5/14; H04L 5/0023; H04L 5/0025

See application file for complete search history.

(56) References Cited

U.S. PATENT DOCUMENTS

| | | | | |
|---|---|---|---|---|
| 2020/0314710 | A1* | 10/2020 | Paladugu | H04W 76/30 |
| 2022/0046496 | A1* | 2/2022 | Zhang | H04W 8/24 |
| 2023/0083266 | A1* | 3/2023 | Wu | H04W 76/34 |
| | | | | 370/331 |

* cited by examiner

Primary Examiner — Peter Chen
(74) Attorney, Agent, or Firm — LEE, HONG, DEGERMAN, KANG & WAIMEY

(57) ABSTRACT

According to the present disclosure, a method for performing, by a user device, measurement report in a wireless communication system may include: receiving, by the user device, a measurement resource from a base station; performing measurement based on the measurement resource; and, transmitting a measurement report including a measurement result to the base station based on a result of the performing. Herein, the measurement report may include the measurement result and information indicating whether or not self-interference cancellation is successful.

11 Claims, 31 Drawing Sheets

METHOD AND APPARATUS FOR PERFORMING HANDOVER IN A WIRELESS COMMUNICATION SYSTEM

BACKGROUND OF THE INVENTION

Field of the Invention

The present disclosure relates to a wireless communication system, and more particularly, to a method and apparatus for performing handover in a full duplex radio (FDR) environment.

Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication method of establishing a direct link between user equipments (UEs) and directly exchanging voice or data between the UEs without a base station (BS). SL is being considered as a method of solving the burden of the base station according to rapidly increasing data traffic.

In addition, the base station may allocate resources for uplink signals or resources for downlink signals to the UE or a vehicle. The base station may allocate the resources for the uplink signals to the UE or the vehicle through uplink control information (UCI) or allocate the resources for the downlink signals to the UE or the vehicle through downlink control information (DCI).

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY

The present disclosure relates to a method and apparatus for performing handover by considering an FDR environment in a wireless communication system.

The present disclosure relates to a method and apparatus for providing a low latency service by reducing a handover execution time in case that a user device performs dual active protocol stack (DAPS) handover in an FDR environment in a wireless communication system.

The present disclosure relates to a method and apparatus for ensuring a synchronization procedure to a target cell in case that a user device performs DAPS handover in an FDR environment in a wireless communication system.

The present disclosure relates to a resource processing method and apparatus based on an overlap between a time resource of a source cell and a time resource of a target cell in case that a user device performs DAPS handover in an FDR environment in a wireless communication system.

The present disclosure relates to a method and apparatus for performing handover based on self-interference cancellation (SIC) in case that a user device performs DAPS handover in an FDR environment in a wireless communication system.

The technical objects to be achieved in the present disclosure are not limited to the above-mentioned technical objects, and other technical objects that are not mentioned may be considered by those skilled in the art through the embodiments described below.

In an embodiment of the present disclosure, a handover method of a user device in a wireless communication system may include: receiving, by a user device operating based on a full duplex radio (FDR) mode, a dual active protocol stack (DAPS) handover request; performing a synchronization procedure with a target cell based on the DAPS handover request; transmitting a handover completion message to the target cell; and being connected to the target cell.

Also, in an embodiment of the present disclosure, a user device for performing handover in a wireless communication system may include a transceiver and a processor coupled with the transceiver, wherein the processor is configured to control the transceiver to receive a DAPS handover request, to implement a synchronization procedure with a target cell based on the DAPS handover request, to control the transceiver to transmit a handover completion message to the target cell, and to be connected to the target cell, and wherein the user device may operate based on an FDR mode.

In an embodiment of the present disclosure, a method of performing, by a base station, handover of a user device in a wireless communication system may include: transmitting a dual active protocol stack (DAPS) handover request to a user device operating based on a full duplex radio (FDR) mode; forwarding buffered data of the user device to a target cell based on the DAPS handover request; and receiving a handover success message from the target cell.

In addition, the following aspects may commonly apply.

As an example of the present disclosure, a user device may operate based on at least any one of a full duplex radio (FDR) mode and a half duplex radio (HDR) mode.

Also, as an example of the present disclosure, when a user device performs handover from a source cell to a target cell based on a DAPS handover procedure, the user device may maintain an enabled status for the source cell until it is connected to the target cell.

Also, as an example of the present disclosure, when a user device operates based on an FDR mode, the user device may be switched to an HDR mode during a DAPS handover procedure and be switched to the FDR mode again after being completely connected to a target cell.

Also, as an example of the present disclosure, when a user device receives a RRC reconfiguration request message including a handover command, the user device may be switched from an FDR mode to a HDR mode, and when the user device transmits, to a target cell, a RRC reconfiguration completion message including handover completion and the target cell transmits a handover success message to a source cell, the user device may be switched from the HDR mode to the FDR mode.

Also, as an example of the present disclosure, in case a user device transmits first data to a source cell and receives second data from a target cell while a DAPS handover procedure is being implemented, if a time resource of the first data transmitted to the source cell and a time resource of the second data received from the target cell overlap with each other, the user device may cancel transmission of the first data and maintain reception of the second data.

Also, as an example of the present disclosure, in case a user device receives first data from a source cell and transmits second data to a target cell while a DAPS handover procedure is being implemented, if a time resource of the first data received from the source cell and a time resource of the second data transmitted to the target cell overlap with each other, the user device may maintain reception of the first data and transmission of the second data.

Also, as an example of the present disclosure, a user device may perform self interference cancellation (SIC) based on reception of first data and transmission of second data based on an FDR mode and transmit an SIC result to a source cell.

Also, as an example of the present disclosure, when SIC of a user device is failure based on an SIC result, a source cell may change a down link configuration for first data and retransmit the first data to the user device based on the changed down link configuration.

Also, as an example of the present disclosure, in case a user device transmits first data to a source cell and receives second data from a target cell while a DAPS handover procedure is being implemented, if a time resource of the first data transmitted to the source cell and a time resource of the second data received from the target cell overlap with each other, the user device may perform SIC based on transmission of the first data and reception of the second data and feed an SIC result back to the target cell.

Also, as an example of the present disclosure, when SIC is failure based on an SIC result, a target cell may transmit an uplink configuration change request to a source cell, the source cell may transmit uplink information on transmission of first data based on the uplink configuration change request to a user device, and the target cell may perform retransmission to the user device by increasing transmission power for second data.

Also, as an example of the present disclosure, in case a user device receives first data from a source cell and transmits second data to a target cell while a DAPS handover procedure is being implemented, if a time resource of the first data received from the source cell and a time resource of the second data transmitted to the target cell overlap with each other, the user device may perform SIC based on reception of the first data and transmission of the second data and feed an SIC result back to the source cell.

Also, as an example of the present disclosure, when SIC is failure based on an SIC result, a source cell may change a down link configuration and retransmit first data.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, handover may be performed by considering an FDR environment.

According to the present disclosure, a low latency service may be provided by reducing a handover execution time in case that a user device performs DAPS handover in an FDR environment.

According to the present disclosure, a synchronization procedure to a target cell may be ensured in case that a user device performs DAPS handover in an FDR environment.

According to the present disclosure, when a user device performs DAPS handover in an FDR environment, a resource processing method may be provided in case that there is an overlap between a time resource of a source cell and a time resource of a target cell and thus a low latency service may be provided by reducing a handover execution time.

According to the present disclosure, when a user device performs DAPS handover in an FDR environment, handover may be performed based on SIC so that the handover may be performed without latency.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
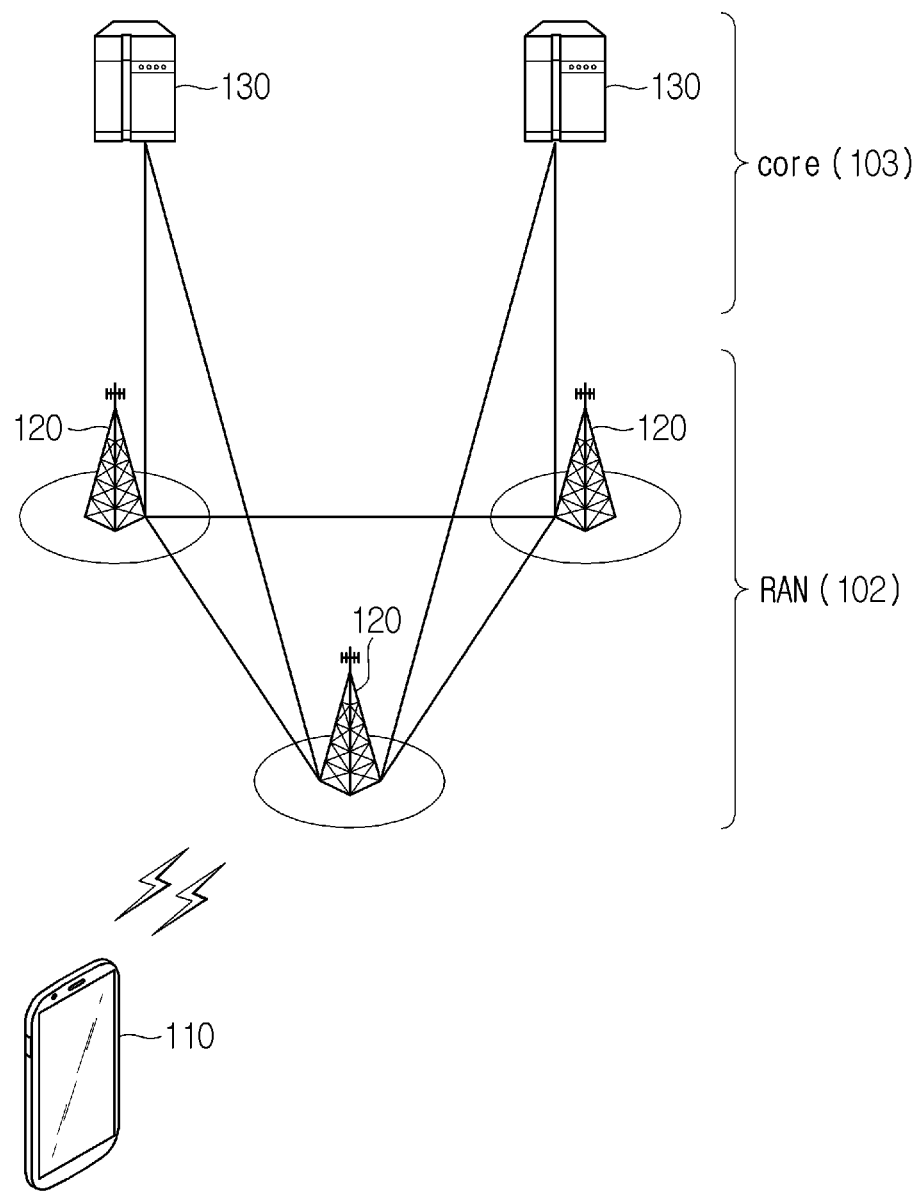
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX and 3GPP38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a user device 110 with a control plane and a user plane. The user device 110 may be fixed or mobile and may be referred to as the other term such as user equipment (UE), mobile station (MS), subscriber station (SS), mobile subscriber station (MSS), mobile user device or advanced mobile station (AMS), wireless device or the like. The base station 120 is a node for providing a radio access service to the user device 110 and may be referred to as the other term such as a fixed station, a Node B, a eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the user device or information on the capabilities of the user device, and such information is mainly used for mobility management of the user device. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a user device unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Radio Resource Structure

Figure 2:
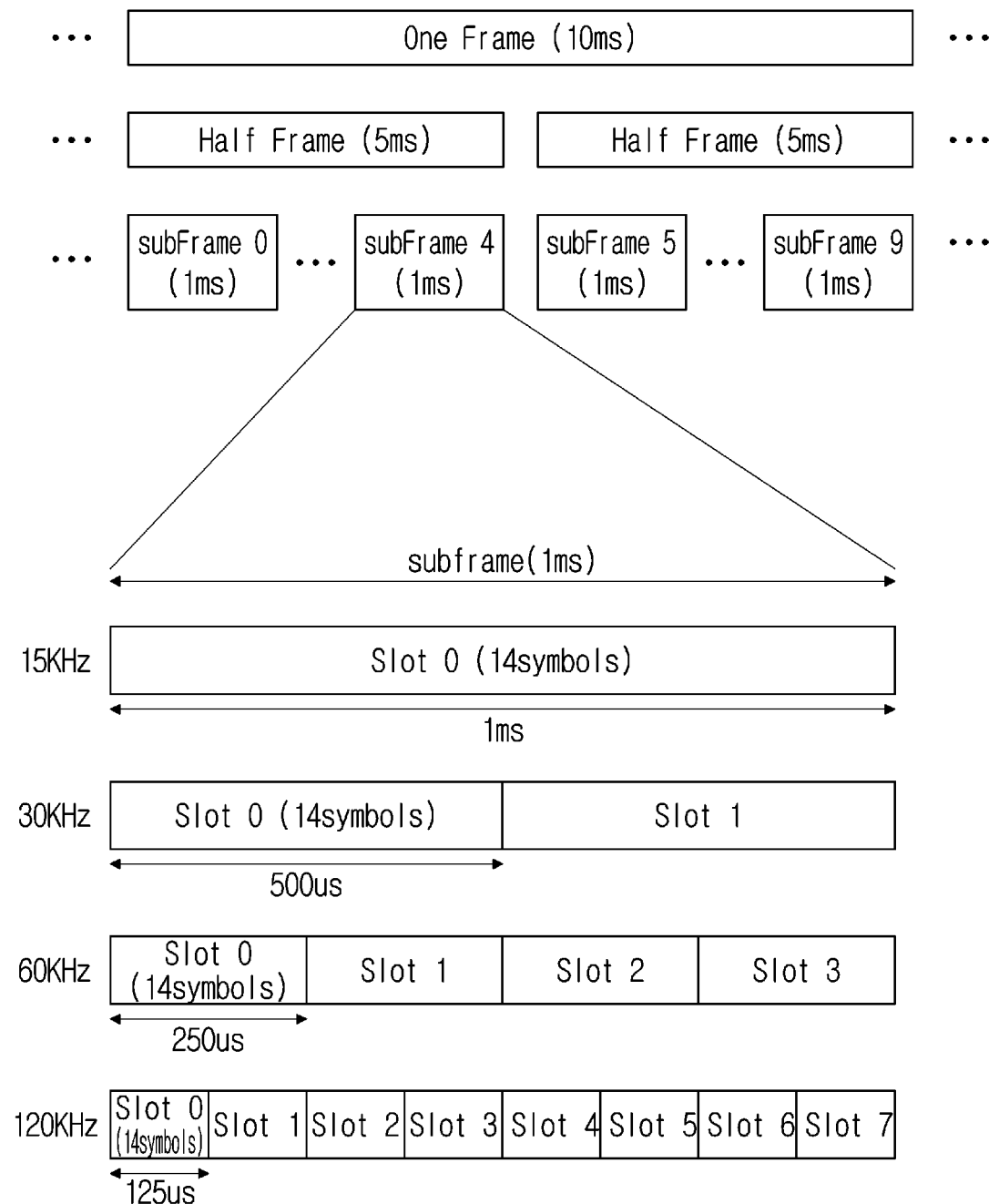
FIG. 2 illustrates the structure of a radio frame of NR according to an embodiment of the present disclosure.

FIG. 2 illustrates the structure of a radio frame of NR according to an embodiment of the present disclosure. The embodiment of FIG. 2 may be combined with various embodiments of the present disclosure.

Referring to FIG. 2, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N^{slot}_{symb}$ of symbols per slot, the number $N^{frame,\mu}_{slot}$ of slots per frame and the number $N^{subframe,\mu}_{slot}$ of slots per subframe may vary according to the SCS configuration (u). For example, SCS $(=15*2^{\mu})$, $N^{slot}_{symb}$, $N^{frame,\mu}_{slot}$, and $N^{subframe,\mu}_{slot}$ may be 15 KHz, 14, 10 and 1 in the case of u=0, may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS$(=15*2^{\mu})$, $N^{slot}_{symb}$, $N^{frame,\mu}_{slot}$, and $N^{subframe,\mu}_{slot}$ may be 60 KHz, 12, 40 and 4 in the case of u=2. In the NR system, an OFDM(A) numerology (e.g., SCS, CP length, etc.) may be differently set among a plurality of cells merged into one user device. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 3:
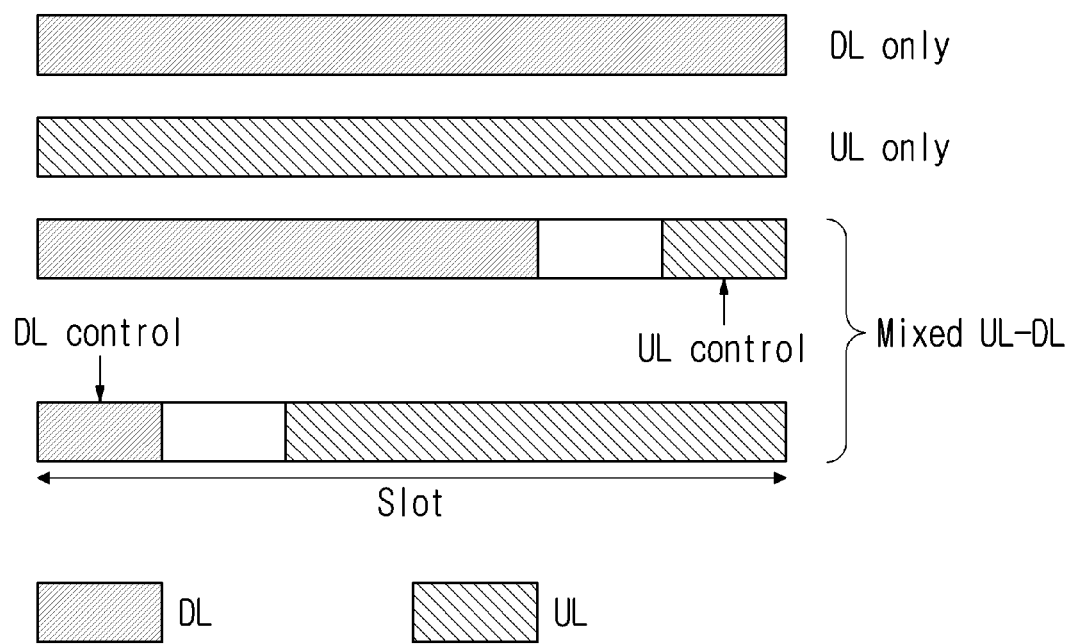
FIG. 3 illustrates the structure of a self-contained slot according to an embodiment of the present disclosure.

FIG. 3 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered. Durations was listed in chronological order.

1. DL only configuration
2. UL only configuration
3. Mixed UL-DL configuration
   DL region+GP (Guard Period)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless user device, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 4:
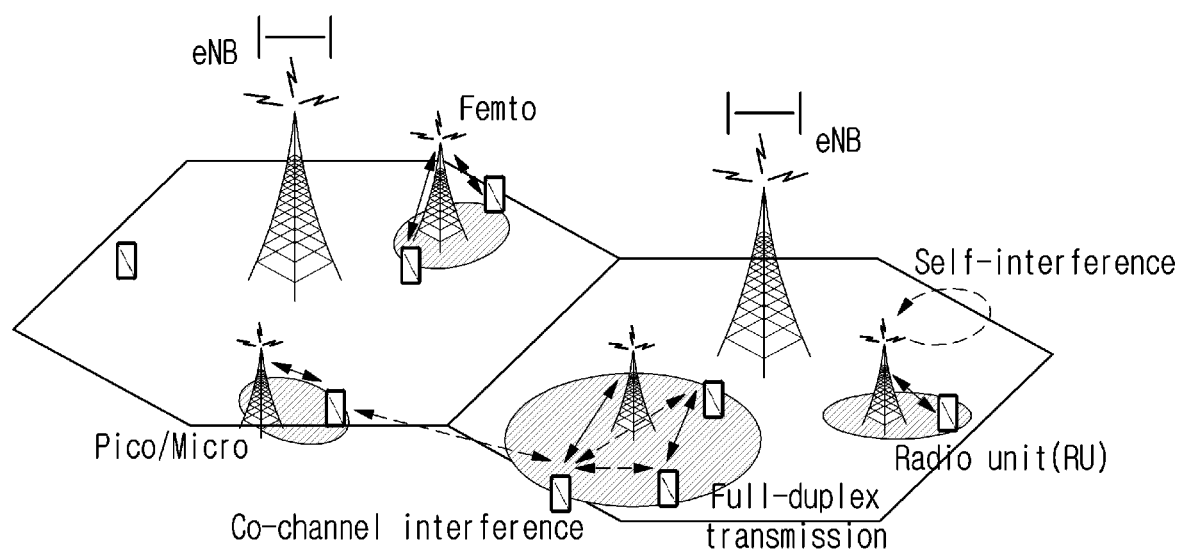
FIG. 4 illustrates the concept of a user equipment (UE) and a base station supporting full duplex radio (FDR) according to an embodiment of the present disclosure.

FIG. 4 illustrates the concept of a user equipment (UE) and a base station supporting full duplex radio (FDR) according to an embodiment of the present disclosure. In the FDR situation shown in FIG. 4, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 5:
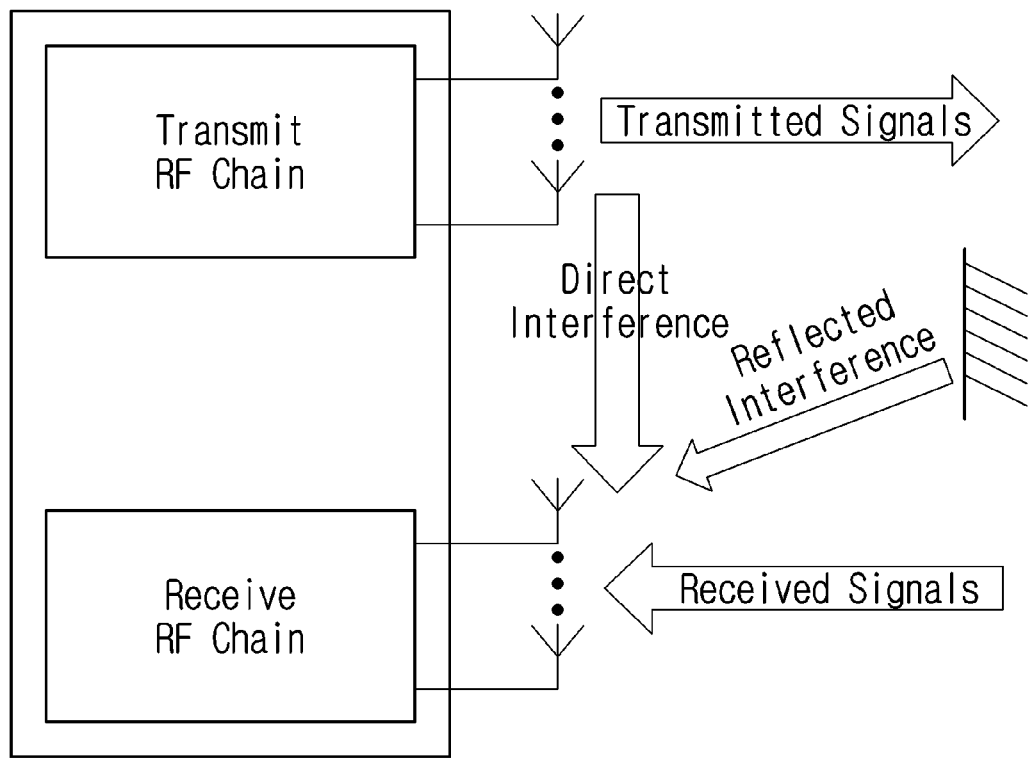
FIG. 5 illustrates an example of transmit/receive link and self-interference in a FDR communication situation according to an embodiment of the present disclosure.

FIG. 5 illustrates an example of transmit/receive link and self-interference in a FDR communication situation according to an embodiment of the present disclosure.

As shown in FIG. 5, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{0,BW}$=−174dBm+10×log$_{10}$(BW), and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

antenna self-IC: This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

analog self-IC: This is a technique that cancels interference at an analog end before a received signal passes through an analog-to-digital converter (ADC) and cancels SI signals using a duplicated analog signal. This may be performed in an RF domain or an IF domain.

A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

digital self-IC: This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 6:
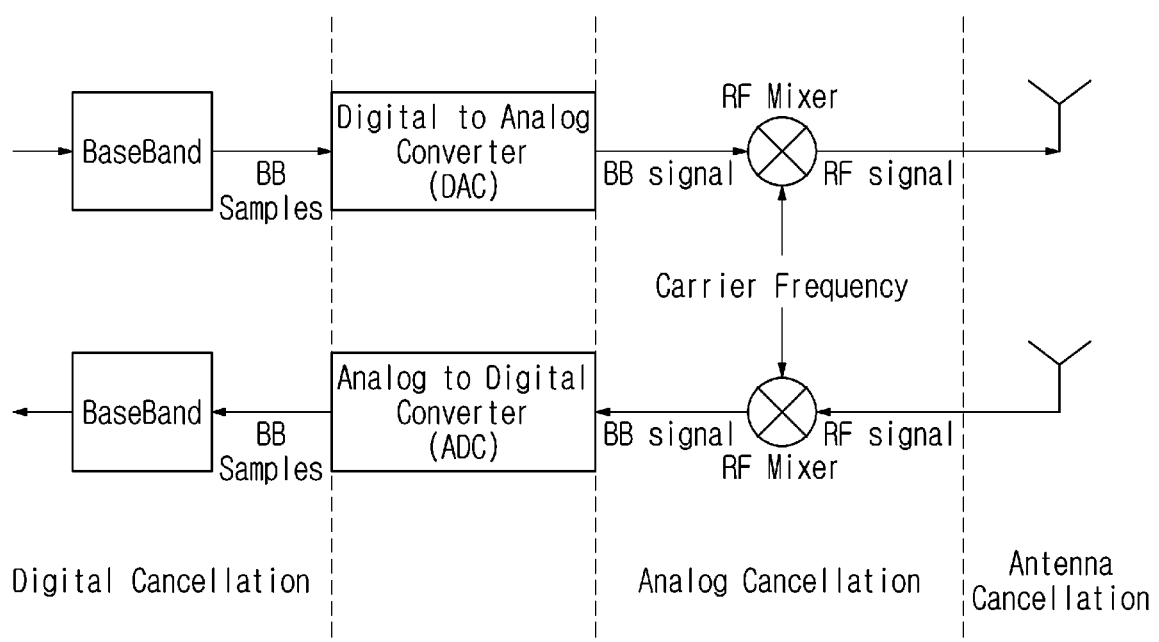
FIG. 6 illustrates a position, to which three interference techniques at a radio frequency (RF) front end is applied, according to an embodiment of the present disclosure.

Positions, to which the above-described three self-interference cancellation techniques are applied, are shown in FIG. 6. FIG. 6 illustrates positions, to which three interference techniques at a radio frequency (RF) front end is applied, according to an embodiment of the present disclosure. Referring to FIG. 6, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 7:
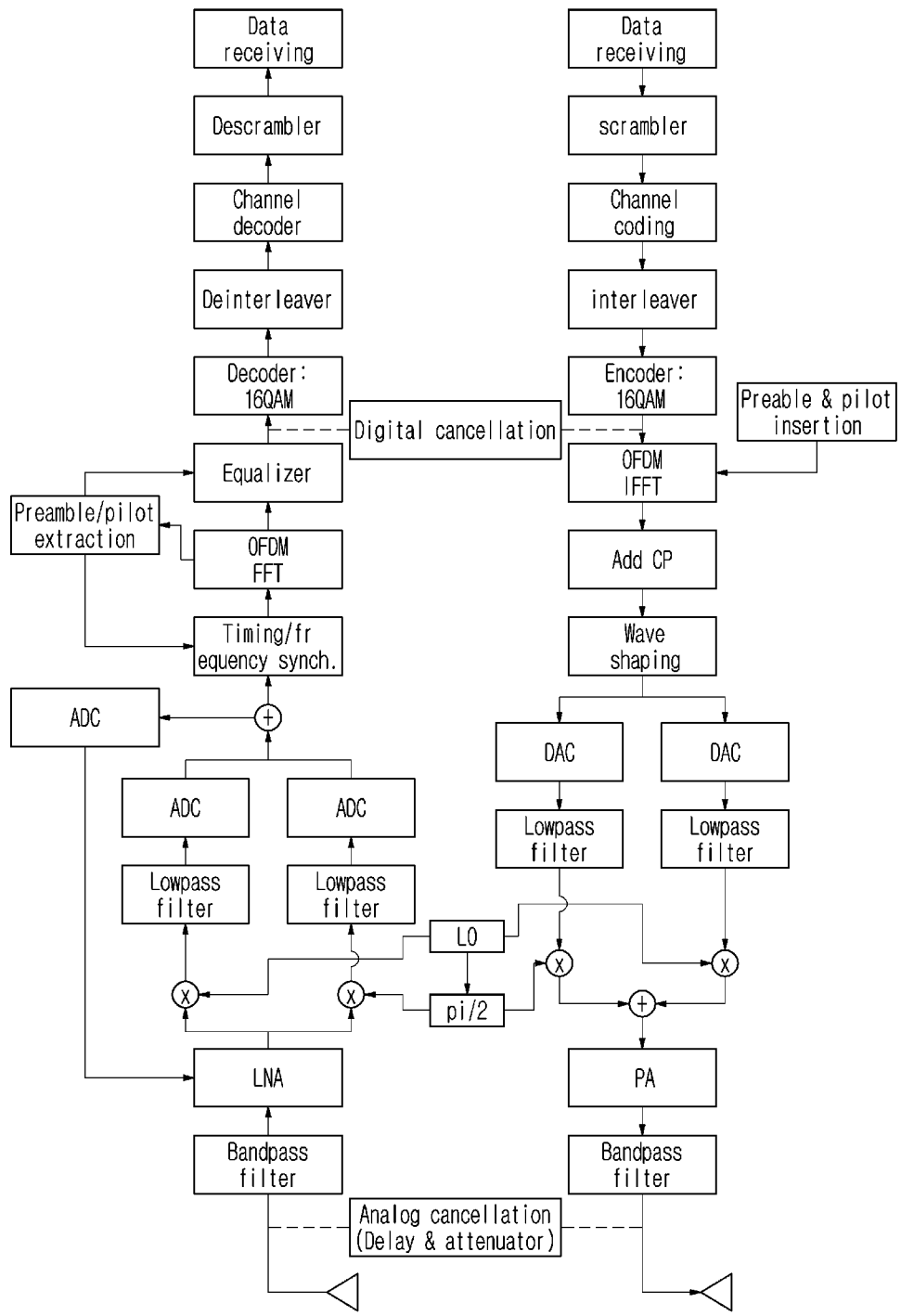
FIG. 7 illustrates the structure of a transceiver for self-interference cancellation in a communication device according to an embodiment of the present disclosure.

FIG. 7 illustrates the structure of a transceiver for self-interference cancellation in a communication device according to an embodiment of the present disclosure. In FIG. 7, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 7 shows a structure for canceling a self-interference signal by separating a transmit antenna and a receiver antenna, an antenna interference cancellation technique using one antenna may be used in another example. In this case, the antenna structure may be different from the example of FIG. 7. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, y(n) denotes a received signal, $h_D(n)$ denotes a channel experienced by desired data, $x_D(n)$ denotes desired data to be received, $h_{SI,k}(n)$ denotes a self-channel experienced by transmitted data, $x_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n),}_{Residual\ SI} \quad \text{[Equation 2]}$$

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Thereafter, a result of decoding the received signal using the gain of the estimated desired channel is shown in Equation 3 below.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} \quad \text{[Equation 3]}$$

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

$$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Detailed Embodiments of the Present Invention

Figure 8:
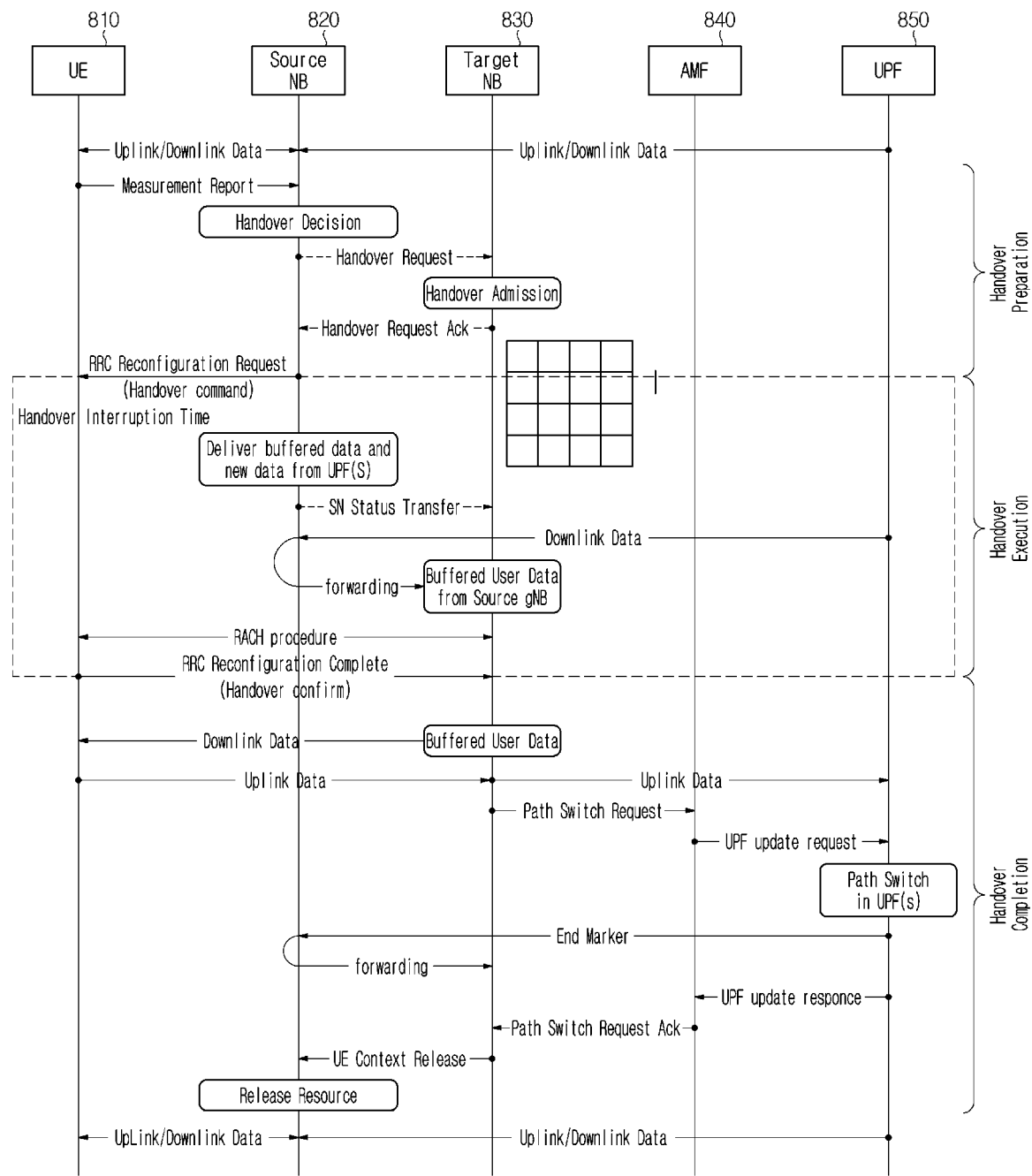
FIG. 8 is a view illustrating a handover procedure according to an embodiment of the present disclosure.

Hereinafter will be described a method of performing a dual active protocol stack (DAPS) handover procedure based on FDR. As an example, FIG. 8 is a view showing a handover procedure applied to the present disclosure. As an example, handover may mean a function of enabling a user device to communicate without interruption and to retain transmitted and received data that the user device uses while moving from a base station (serving NB) of a cell, with which it is currently being connected and communicates, to a cell of another base station (target NB).

As described above, in case a user device and a base station set a RRC connection in order to enable the user device not to lose but to constantly retain transmitted and received data, the base station may provide event information associated with handover to the user device. Herein, the event information may include whether or not to report received signal strength in case of the occurrence of a specific event in a measurement control message and may be forwarded from the base station to the user device by being included in a RCC configuration (or reconfiguration) message. As an example, Table 2 below may be the event-related information described above but may not be limited thereto.

TABLE 2

Event A1 (Serving becomes better than threshold)
Event A2 (Serving becomes worse than threshold)
Event A3 (Neighbor becomes offset better than SpCell)
Event A4 (Neighbor becomes better than threshold)
Event A5 (SpCell becomes worse than threshold1 and neighbor becomes better than threshold2)
Event A6 (Neighbor becomes offset better than SCell)
Event B1 (Inter RAT neighbor becomes better than threshold)
Event B2 (PCell becomes worse than threshold1 and inter RAT neighbor becomes better than threshold2)
Event I1 (Interference becomes higher than threshold)
Event C1 (The NR sidelink channel busy ratio is above a threshold)
Event C2 (The NR sidelink channel busy ratio is below a threshold)

As an example, referring to FIG. 8, a user device 810 may receive and transmit data from and to a source base station (or serving base station) 820. Herein, the source base station 820 may be connected to a corresponding access and mobility management function (AMF) 840 and be managed by a user plane function (UPF) 850. As an example, mobility of a user device of AMF 840 may be managed, and information associated with a user plane like packet routing or PDU session may be managed by UPF 850, but the present disclosure is not limited to the above-described embodiment. In addition, the user device 810 may measure received signal strength of a serving cell and a neighbor cell. Herein, in case the above-described event occurs, the user device 810 may report information on measured signal strength to the source base station 820 through a measurement report message. The source base station 820 may determine handover to a target cell based on state information of cells together with the information on signal strength reported by the user device 810. Herein, at a handover preparation step, the source base station 820 and the target base station 830 may perform preparation for handover of the user device 810. Herein, the source base station 820 may forward a context of the user device to the target base station 830 and check whether or not the target base station 830 is capable of providing a service. Herein, when the target base station 830 is capable of providing a service, the target base station 830 may set a transport bearer for packet forwarding. Herein, the target base station 830 may allocate a C-RNTI value used by the user device 810 accessing the target base station 830 and may transfer the C-RNTI value to the source base station 820. Herein, the source base station 820 may transfer the C-RNTI value to the user device 810. Then, a resource for packet forwarding between the source base station 820 and the target base station 830 may be allocated. When a resource for the user device 810 is allocated from the target base station 830 and support of handover is completely prepared, the source base station 820 may transfer a handover command message to the user device 810, and the user device 810 may execute handover.

After the handover preparation step, a handover execution step may be implemented. Herein, the handover execution step may be a step in which the user device 810 actually executes handover. When executing handover, the user device 810 may access a new cell by disconnecting a link to the source base station 820 and setting a link to the target base station 830. Herein, using C-RNTI for the target base station 830, which was received from the source base station 820 at the handover preparation step, the user device 810 may quickly access the target base station 830. Herein, a down link packet transferred to the source base station 820 during the handover process may be transferred from the source base station 820 to the target base station 830 through a forwarding bearer. Thus, as the down link packet is buffered in the target base station 830 until the user device 810 completes access to the target base station 830, packet loss may be prevented. In addition, an uplink packet occurring in the user device 810 may be suspended until the user device 810 completes access to the target base station 830. When the user device 810 completes access to the target base station 830, the user device 810 may transmit the uplink packet directly to the target base station 830.

After handover is executed, a handover completion step may be implemented. Herein, the handover completion step may be a step in which, after the user device 810 successfully completes access to the target base station 830, an access path of the user device 810 is changed to the target base station 830. As an example, the forwarding bearer, which forwarded the down link packet from the source base station 820 to the target base station 830 at the handover execution step described above, may be deactivated after the path is changed. Based on what is described above, the user device 810 may complete handover from the source base station 820 to the target base station 830.

As an example, when handover is performed based on what is described above, a user device is incapable of performing data exchange with a base station for a certain period in the handover procedure. As an example, a period during which a user device and a base station cannot perform data exchange may be a handover interruption time but may not be limited to this term.

As an example, at a handover preparation step, base stations may allocate a resource for handover in advance so that no down link packet is lost during actual execution of handover, which is the same as described above. However, at a handover execution step, when a user device disconnects wireless access to a source base station, there may be a time in which packet transmission and reception cannot be performed between the user device and a cell, until the user device completes wireless access to a target base station. As an example, referring to Table 3, an existing system (e.g. LTE) may have a handover interruption time of about 30 ms to 60 ms, but this is merely one example, and the present disclosure is not limited to the above-described embodiment. Herein, in case there is a long handover interruption time, no seamless service may be supported for a user device, and quality degradation may occur.

TABLE 3

| Description | |
| --- | --- |
| RRC Connection Reconfiguration (TS36.331) | 15 ms |
| SN Status Transfer | 0 ms |
| (This may occur concurrently with Synchronization) | |
| Synchronization | |
| Target cell search (under the assumption that cell is known) | 0 ms |
| UE processing time for RF/baseband re-tuning, security update (TS36.133) | 30 ms |
| Delay to acquire first available PRACH in target NB | min. 0.5 ms/ avg. 2.5 ms |
| PRACH preamble transmission | 1 ms |
| UL Allocation + TA for UE | min. 3 ms/ avg. 5 ms |
| UE sends RRC Connection Reconfiguration Complete (TS36.213, assuming k1 = 6 subframe) | 6 ms |
| Total (min./avg) | 45.5 ms/49.5 ms |

As an example, a latency requirement demanded based on ultra reliable low latency communication (URLLC) in a new system (e.g. 5G) may have a user plan latency of 1 ms and below and a reliability requirement of 10 ms-5 ms and below. Considering the above-described requirement of the new system, it is necessary to reduce a handover interruption time in URLLC close to 0 ms. As an example, based on what is described above, dual active protocol stack (DAPS) handover may be considered. DAPS handover may be a make-before-break (MBB) handover technique. Specifically, when handover is performed based on DAPS handover, a user device may maintain an activated state for a source cell in order to perform reception and transmission of user data without interruption until user data is received and transmitted from and to a target cell.

Figure 9:
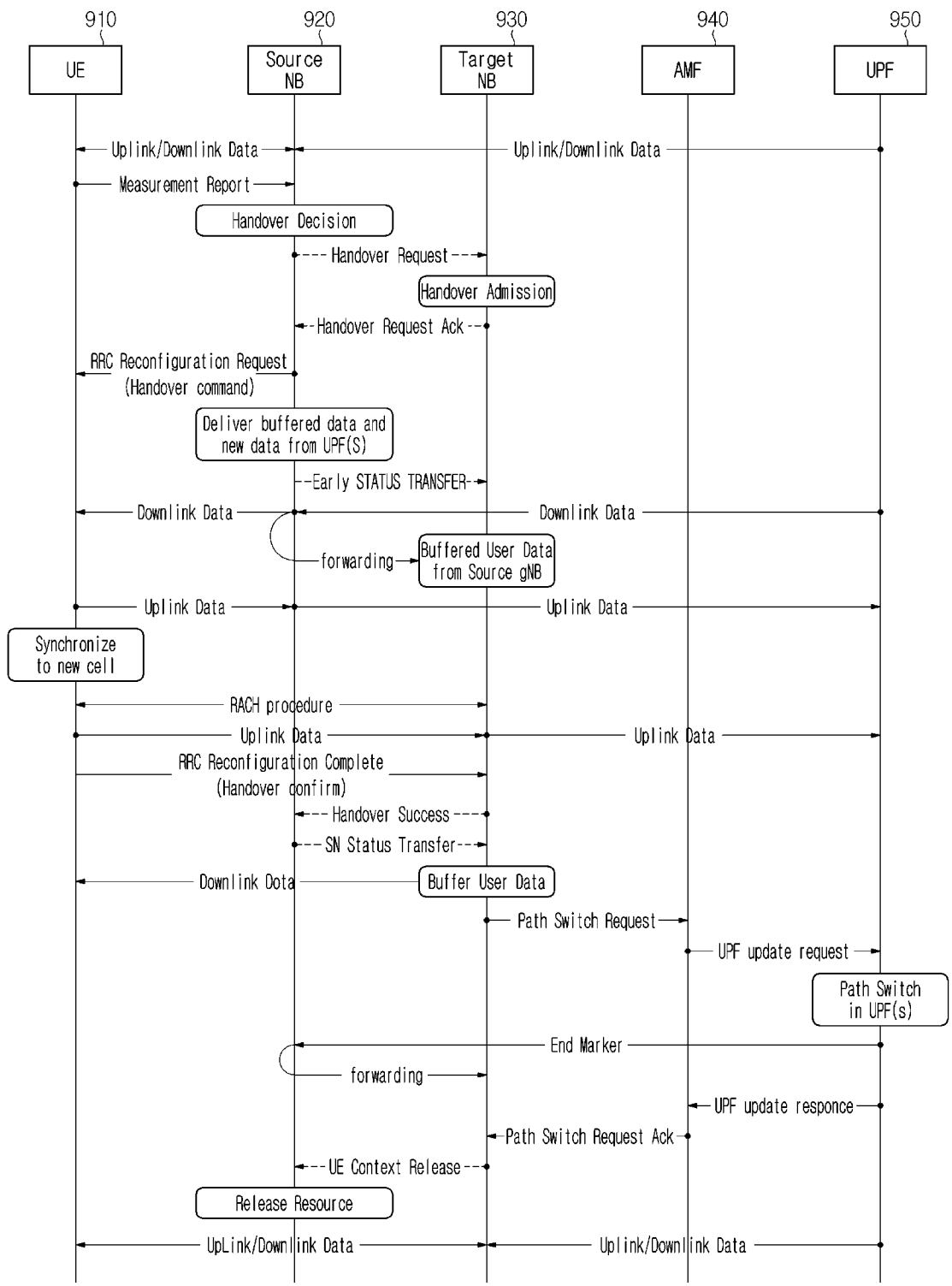
FIG. 9 is a view showing a handover procedure according to an embodiment of the present disclosure.

As an example, referring to FIG. 9, at a handover preparation step, a source base station 920 may request DAPS handover when transmitting a handover request to a target base station 930 for performing handover of a user device 910. Based on the DAPS handover request, the source base station 920 may receive a handover request ACK from the target base station 930. Next, the source base station 920 may transmit a handover command in a RRC message to the user device 910. In addition, the source base station 920 may transmit an "EARLY SN STATUS" message to the target base station 930. Herein, while transferring down link user data to the user device 910, the source base station 920 may simultaneously transfer data to the target base station 930 together with an allocated SN status. At this time, user data transferred to the target base station 930 may be buffered. Herein, when the user device 910 completes a synchronization procedure with the target base station 930, the source base station 920 may receive a handover success message from the target base station 930. At this time, the source base station may transfer the SN status and maintain an activated status for the source base station 920 until SN is allocated to the target base station 930. Herein, when the user device 910 completes a random access procedure for synchronization to a target cell, an uplink may be switched from the source base station 920 to the target base station 930. Next, the user device 910 may transfer SN of data, which is received last from the source base station 920, to the target base station 930. Based on data received from the user device, the target base station 930 may recognize whether or not down link data has been transmitted to the user device and may also prevent redundant data from being transmitted. As the user device 910 receives user data both from the source base station 920 and from the target base station 930 at the same time, a packet data convergence protocol (PDCP) layer may be reconfigured as a common PDCP entity for a user plan protocol stack of the source base station 920 and a user plan protocol stack of the target base station 930. In addition, as an example, PDCP sequence number (SN) continuity may be maintained throughout a whole handover procedure in order to ensure sequential transfer of user data, and a DAPS handover procedure may be implemented based on what is described above.

Herein, as an example, a DAPS handover-related operation of a base station and a user device may be restricted based on whether the handover is intra-frequency handover or inter-frequency handover. As an example, intra-frequency handover may be a case where a synchronization signal block (SSB) center frequency of a source cell is the same as a center frequency of a target cell.

Specifically, as a case not pertaining to intra-frequency handover, it is possible to consider a case of not supporting "interFreqUL-TransCancellationDAPS". That is, it may be a case of not supporting uplink transmission cancellation for inter frequency. Herein, in case a source master cell group (MCG) and a target MCG share no power or are not "uplinkPowerSharingDAPS-Mode", transmission may be performed from an overlapping time resource neither to a target base station nor to a source base station.

As another example, as a case not pertaining to intra-frequency handover, it is possible to consider a case of supporting "interFreqUL-TransCancellationDAPS". That is, it may be a case of supporting uplink transmission cancellation for inter frequency. Herein, in case a source MCG and a target MCG share no power or are not "uplinkPowerSharingDAPS-Mode", transmission may be performed from an overlapping time resource only to a target base station, but the transmission may not be performed to a source base station. On the other hand, in the case of intra-frequency handover, transmission may be performed from an overlapping time resource only to a target base station, and the transmission may not be performed to a source base station.

Herein, as an example, an operation for the source base station and the target base station may be performed based on Table 4 below, and an overlap may occur in a time resource based on this. However, this is merely one example and may not be limited to Table 4.

Figure 10:
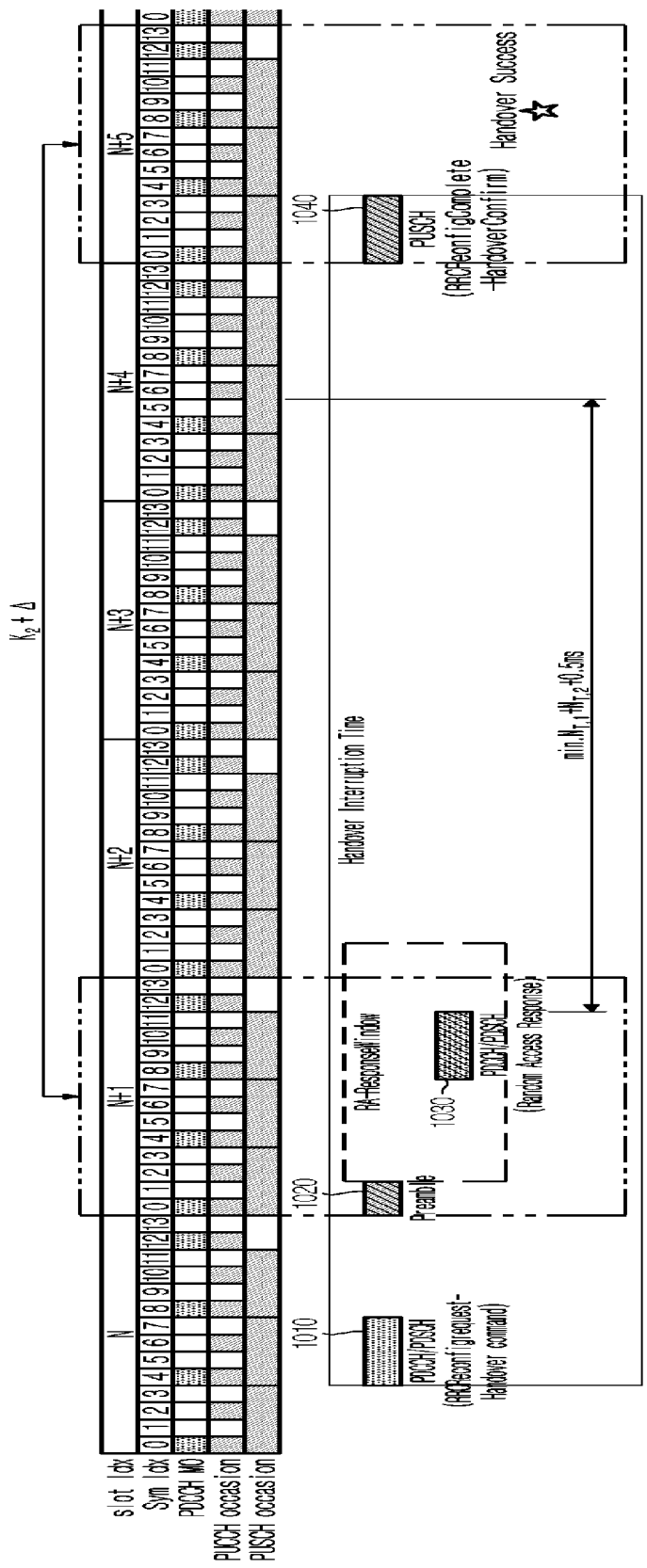
FIG. 10 is a view showing a timing diagram of performing handover according to an embodiment of the present disclosure.

TABLE 4 a. intra-frequency handover : SSB center frequency of a source cell and center frequency of a target cell are identical. (e.g. TS38.133 [2] 6.1.3)
b. Subcarrier spacing of every physical channel of a source cell and a target cell is 30 kHz, and a timeline between cells is aligned.
c. UE supports UE Capability 2.
d. PRACH
    4-step Contention Free RACH procedure, formatA2 (2 symbol), ra-ResponseWindow = slot 1
    After receiving PDSCH(RAR) in slot n, it is time to transmit PUSCH(RAR UL grant) (e.g. TS38.213 8.3)
      After minimum $N_{T,1} + N_{T,2}$ + 0.5ms = 22 symbol + 0.5ms = 36 symbol, PUSCH may be transmitted.
        N1 : PDSCH processing time for UE processing capability 1 when additional PDSCH DM-RS is configured = 10 symbol
        N2 : PUSCH preparation time for UE processing capability 1 = 12 symbol
      Transmit PUSCH to slot(n) + $K_2$ + Δ slot ($K_2$ = 1, Δ = 3), start, symbol 0, length 4 symbol
e. PDCCH/PDSCH : PDCCH and PDSCH have 1 symbol overlap
    PDCCH : 1 symbol, monitoring occasion #0, #4, #8, #12 symbol
    PDSCH : mapping type B, 4 symbol
      UE PDSCH processing procedure time (TS38.214 [4] 5.3)
        $T_{proc,1}$ = $N_1$(4.5) symbol + $d_{1,1}$(1) symbol = 5.5 symbol
      NB PDSCH preparation procedure time = $N_2$(5.5) symbol + 2 symbol = 7.5 symbol
      PUCCH/PUSCH :
    PUCCH : 1 symbol, transmission occasion #0, #2, #4, #6, #8, #10, #12 symbol
    PUSCH : 4 symbol, transmission occasion #0, #4, #8, #12 symbol
      UE PUSCH preparation procedure time (TS38.214 [4] 6.4)
        $T_{proc,2}$ = $N_2$ (5.5) symbol = 5.5 symbol
      NB PUSCH processing procedure time = $N_1$(4.5) symbol + 2 symbol = 6.5 symbol FIG. 10 is a view showing a timing diagram of performing handover applicable to the present disclosure. In FIG. 10, a user device and a base station may operate based on Table 4 described above but may not be limited thereto.

Referring to FIG. 10, a handover interruption time may occur in 5 slot sections. As an example, when a subcarrier spacing (SCS) is 30 kHz, a source base station and a user device may not exchange data for about 2.5 ms. As an example, the user device may receive a handover command message as a RRC reconfiguration message based on PDCCH/PASCH 1010 and perform a random access procedure to the target base station. Herein, the user device may transmit a random access channel (RACH) preamble 1020 to the target base station, receive a random access response (RAR) 1030 from the target base station and thus perform a synchronization procedure with the target base station. Next, the user device may complete the handover procedure by transmitting a handover confirmation message 1040 through a RRC reconfiguration completion message based on PUSCH. In this case, a source base station and the user device may communicate with each other during the handover interruption time.

Figure 11:
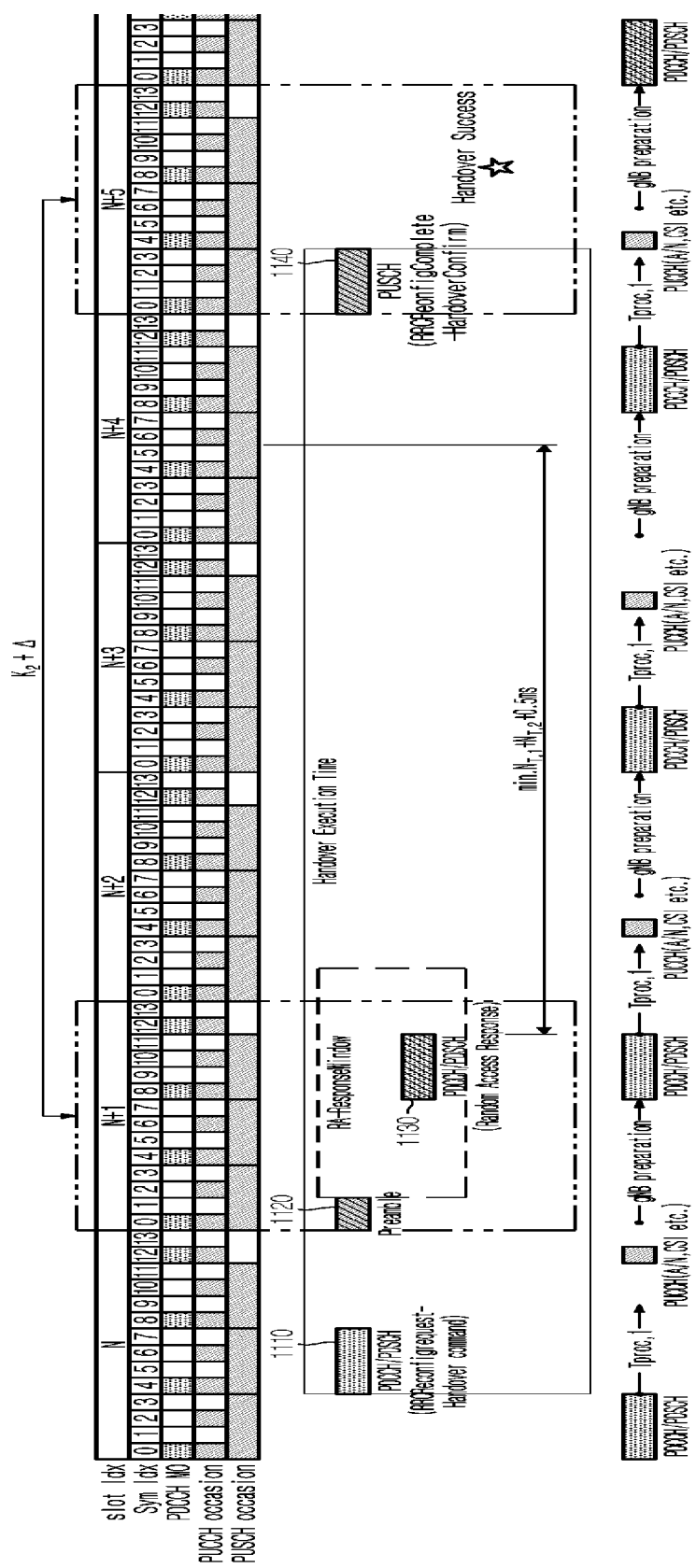
FIG. 11 is a view showing a timing diagram of a DAPS handover procedure according to an embodiment of the present disclosure.
Figure 12:
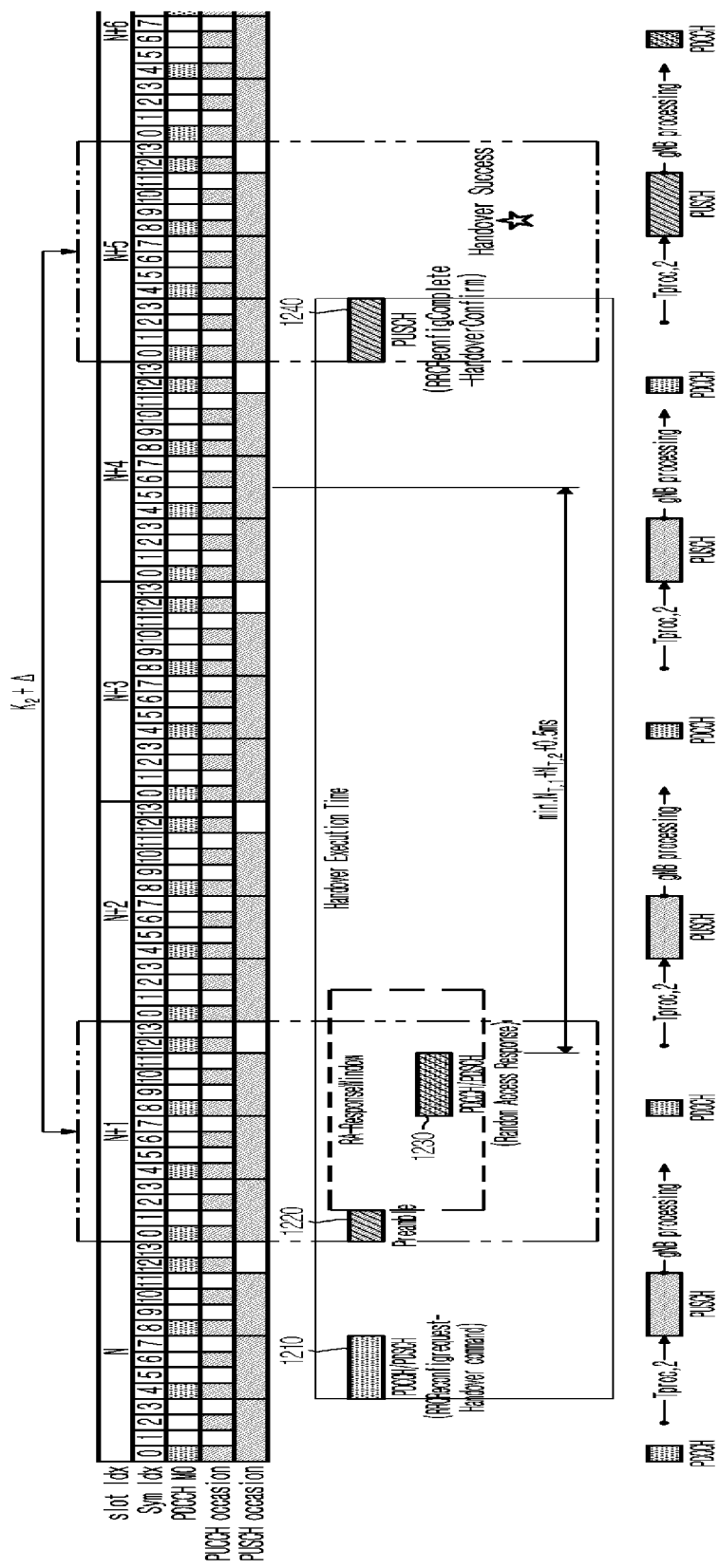
FIG. 12 is a view showing a timing diagram of a DAPS handover procedure according to an embodiment of the present disclosure.

Herein, as an example, the above-described DAPS handover may be performed to reduce a handover interruption time. More particularly, FIG. 11 and FIG. 12 are views showing a timing diagram of a DAPS handover procedure applicable to the present disclosure. As an example, referring to FIG. 11 and FIG. 12, a user device may perform a synchronization procedure in order to perform handover to a target base station, which may be the same as FIG. 10 described above. Herein, data exchange between a user device and a source base station was interrupted in FIG. 10, but a source base station and a user device in FIG. 11 and FIG. 12 may perform data exchange without interruption based on DAPS handover.

Herein, as an example, in case there is an overlap of uplink time resource in the above-described intra-frequency handover, the user device may perform transmission only to a target base station and cancel transmission to the source base station.

Figure 13:
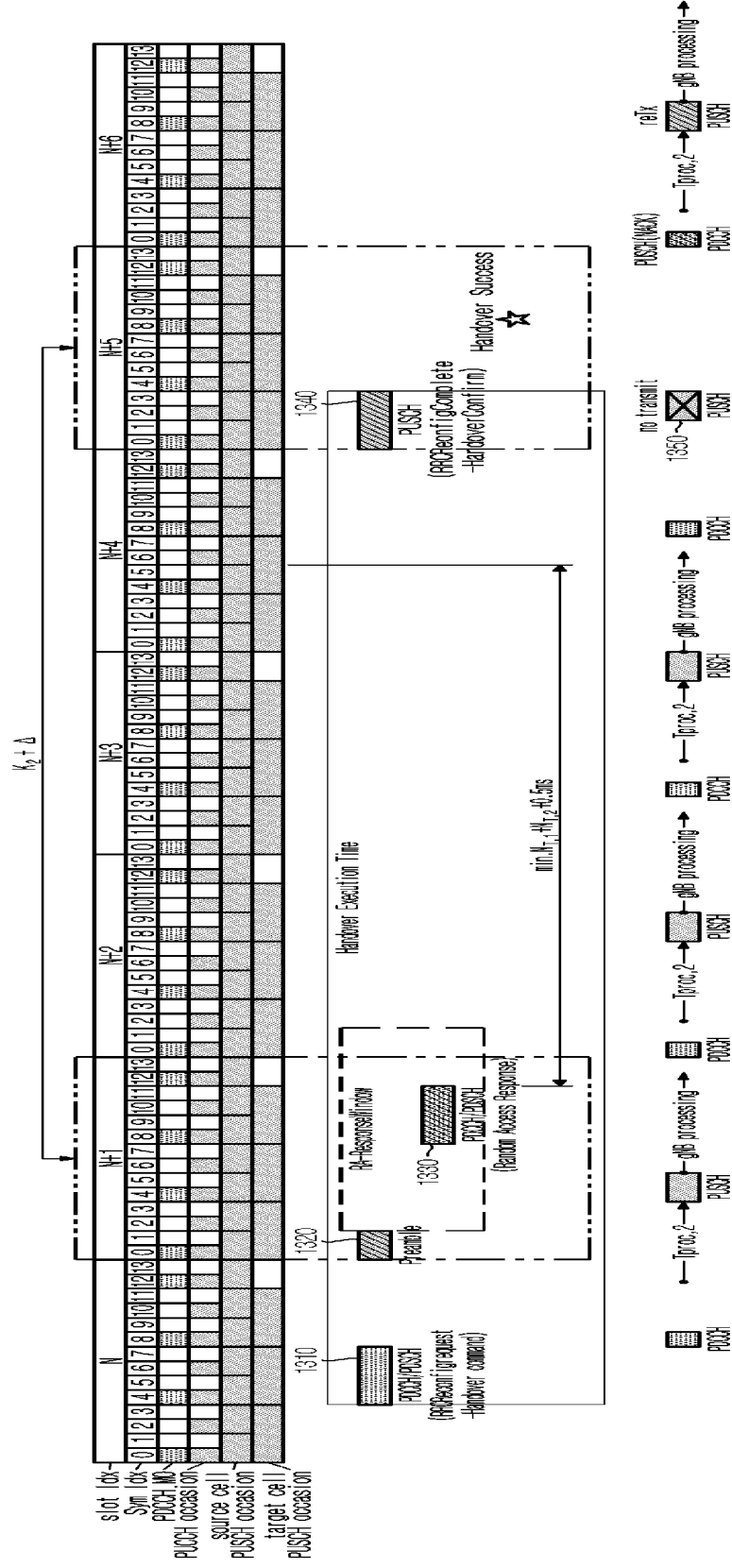
FIG. 13 is a view showing a case in which uplink time resources overlap based on intra-frequency handover according to an embodiment of the present disclosure.
Figure 14:
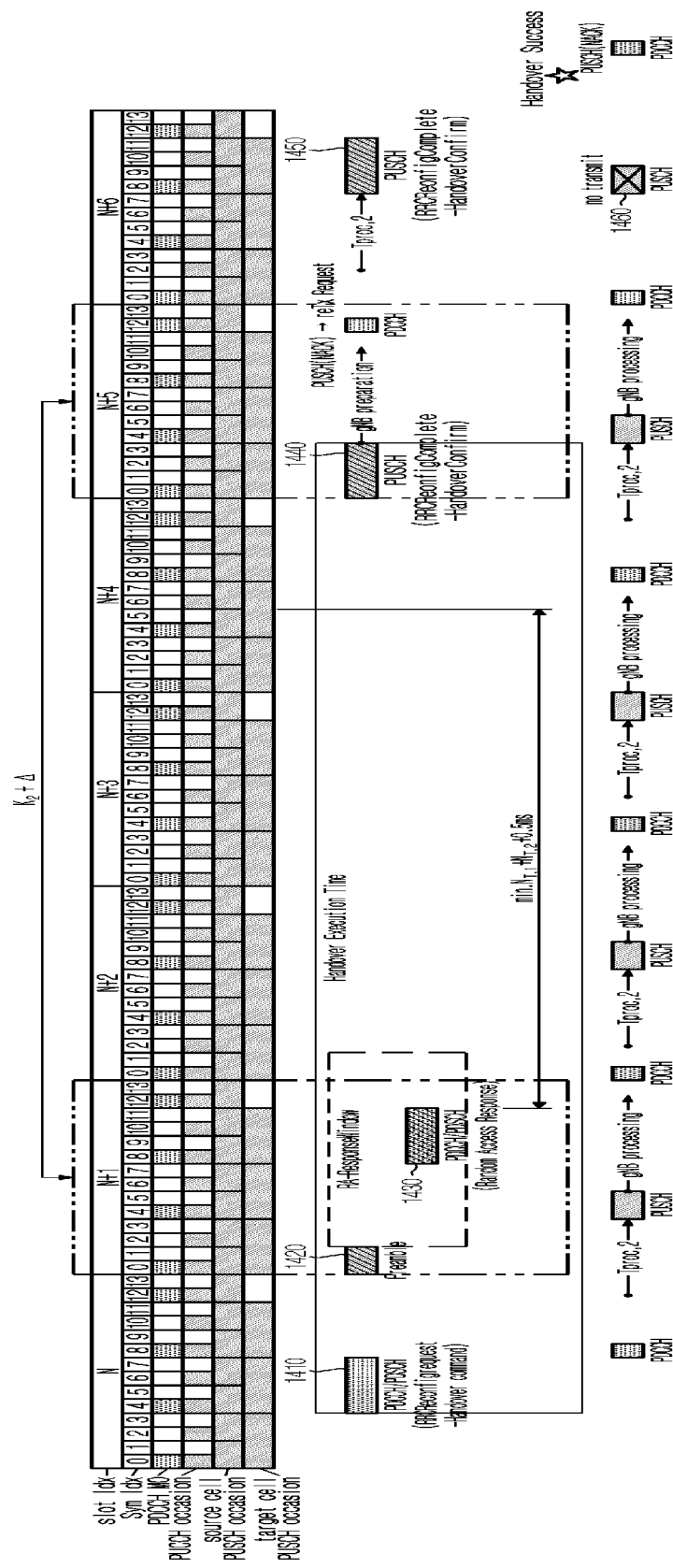
FIG. 14 is a view showing a case in which uplink time resources overlap based on intra-frequency handover according to an embodiment of the present disclosure.

FIG. 13 and FIG. 14 are views showing a case in which uplink time resources overlap based on intra-frequency handover. Referring to FIG. 13, when uplink time resources overlap in intra-frequency handover, transmission may be performed only to a target base station, and transmission to a source base station may be canceled. As an example, intra-frequency handover may be performed in which a SSB center frequency of the source base station and a frequency of the target base station are identical. Herein, in FIG. 13, based on a synchronization procedure, PUSCH 1340, which the user device transmits to the target base station, may overlap with a time resource of uplink 1350 that the user device transmits to the source base station. Herein, although in the case of DAPS handover, the user device may cancel transmission to the source base station and perform transmission only to the target base station.

In addition, as an example, also in FIG. 14, when PUSCH 1450 is retransmitted based on transmission failure of PUSCH 1440 that a user device transmits to a target base station, if PUSCH 1460, which the user device transmits to a source base station, overlaps with an uplink time resource, the user device may cancel transmission to the source base station and perform transmission only to the target base station. As an example, FIG. 13 and FIG. 14, PUSCH may have a 2-symbol length, and transmission occasions may be symbols of #0, #2 , #4 , #6 , #8 , #10 and #12, but this is merely one example, and the present disclosure is not limited to the above-described embodiment.

Herein, it is possible to consider a case in which a user device supports a full duplex radio (FDR) mode. As an example, when a user device supporting an FDR mode performs DAPS handover, the user device may operate a DL/UL physical channel resource based on FDR and thus reduce latency.

Figure 15:
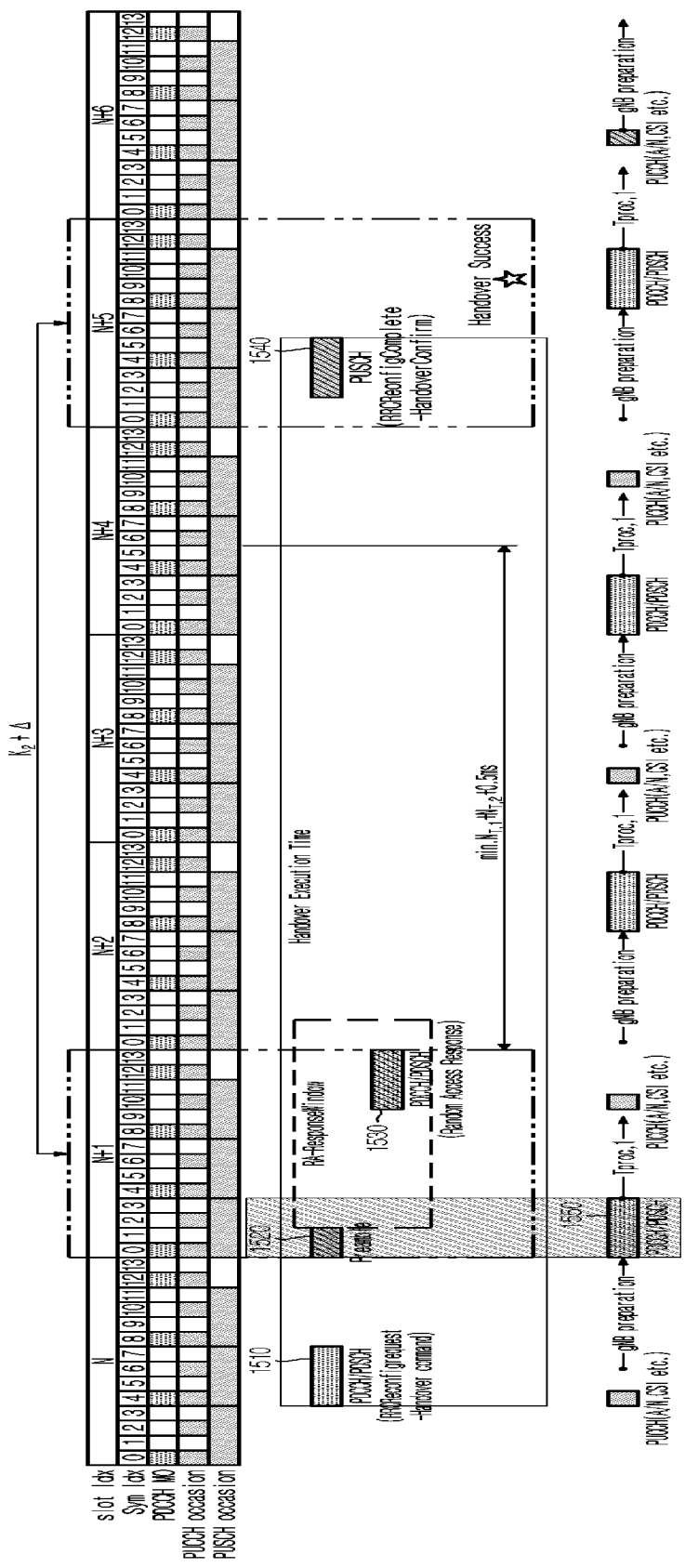
FIG. 15 is a view showing a method of performing handover based on an FDR mode according to an embodiment of the present disclosure.
Figure 16:
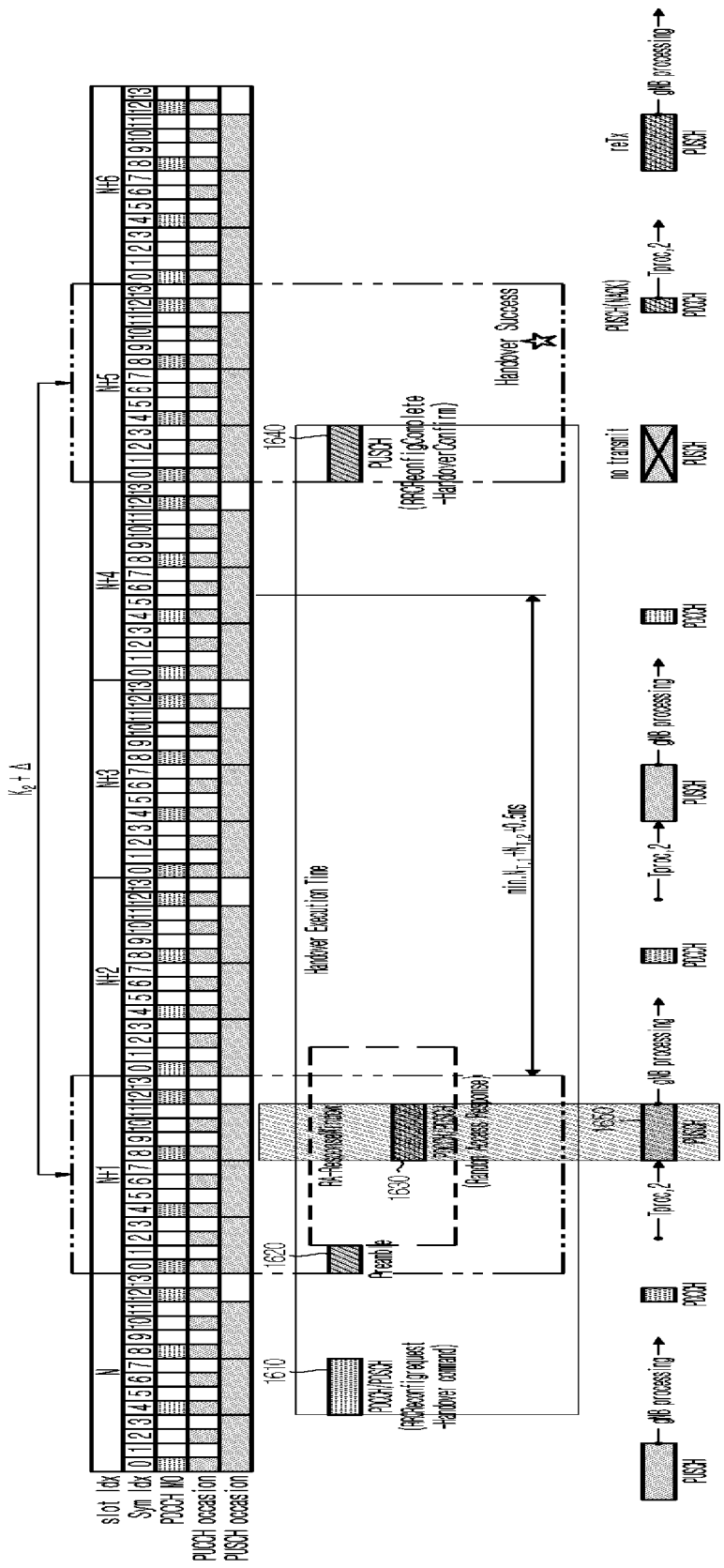
FIG. 16 is a view showing a method of performing handover based on an FDR mode according to an embodiment of the present disclosure.

FIG. 15 and FIG. 16 are views showing a method of performing handover based on an FDR mode applicable to the present disclosure. Referring to FIG. 15, a user device may perform a synchronization procedure with a target base station for handover. Herein, a preamble 1520, which the user device transmits to the target base station, may overlap with a time resource of data 1550 that the user device receives from a source base station. Herein, the user device may transmit the preamble 1520 to the target base station, while receiving the data 1550 from the source base station based on the FDR mode.

As an example, referring to FIG. 16, a user device may perform a synchronization procedure with a target base station for handover. Herein, when RAR 1630 is received based on a preamble 1620 that the user device transmits to the target base station, RAR 1630 may overlap with a time resource of data 1650 that the user device transmits to a source base station. Herein, the user device may receive the RAR 1630 from the target base station, while transmitting the data 1650 to the source base station based on the FDR mode. Herein, as an example, in the case of a user device operating based on the FRD mode, down link performance may be reduced because of self-interference of the user device, and in consideration of what is described above, an operating method for a physical channel resource between the user device and a base station may be necessary, which will be described below.

Figure 17:
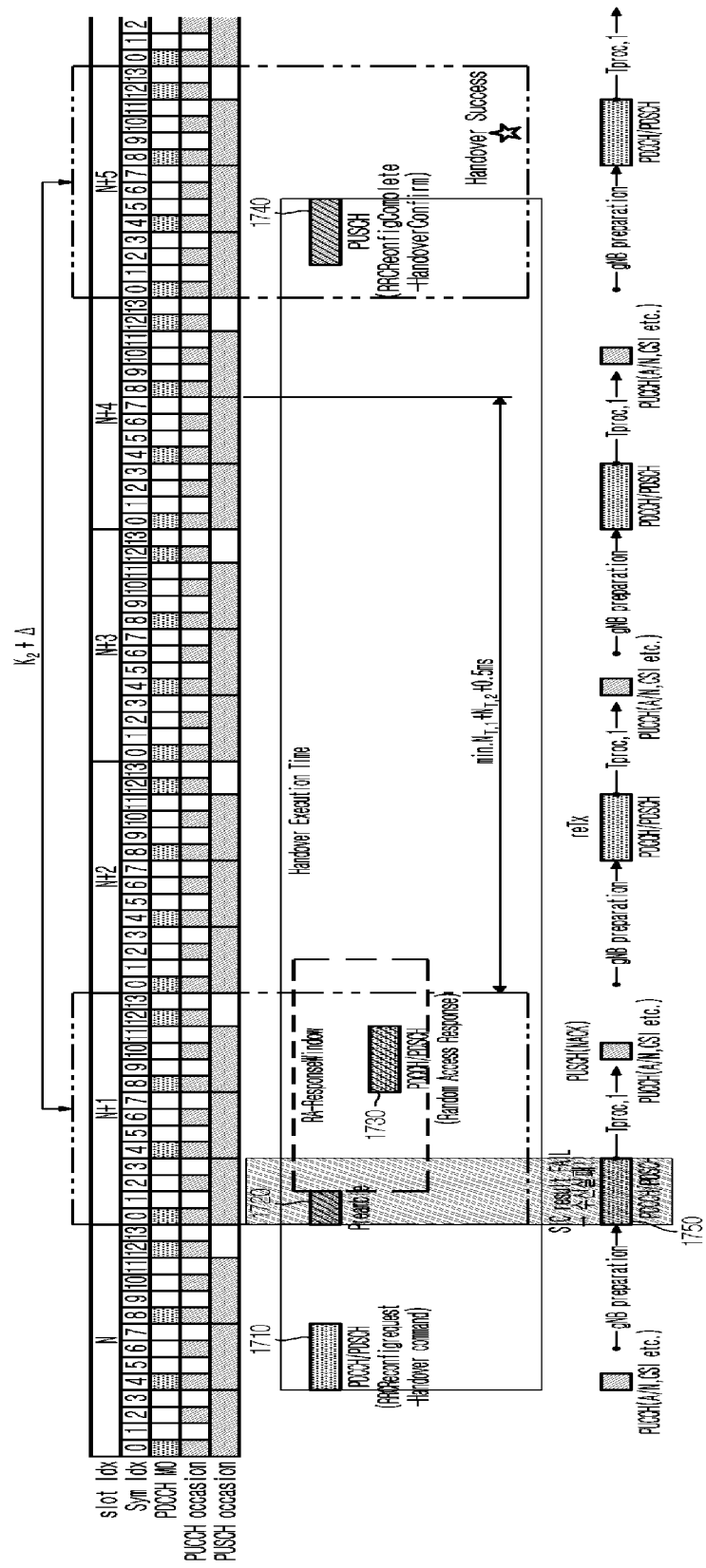
FIG. 17 is a view showing a case of down link reception failure based on SIC failure according to an embodiment of the present disclosure.
Figure 18:
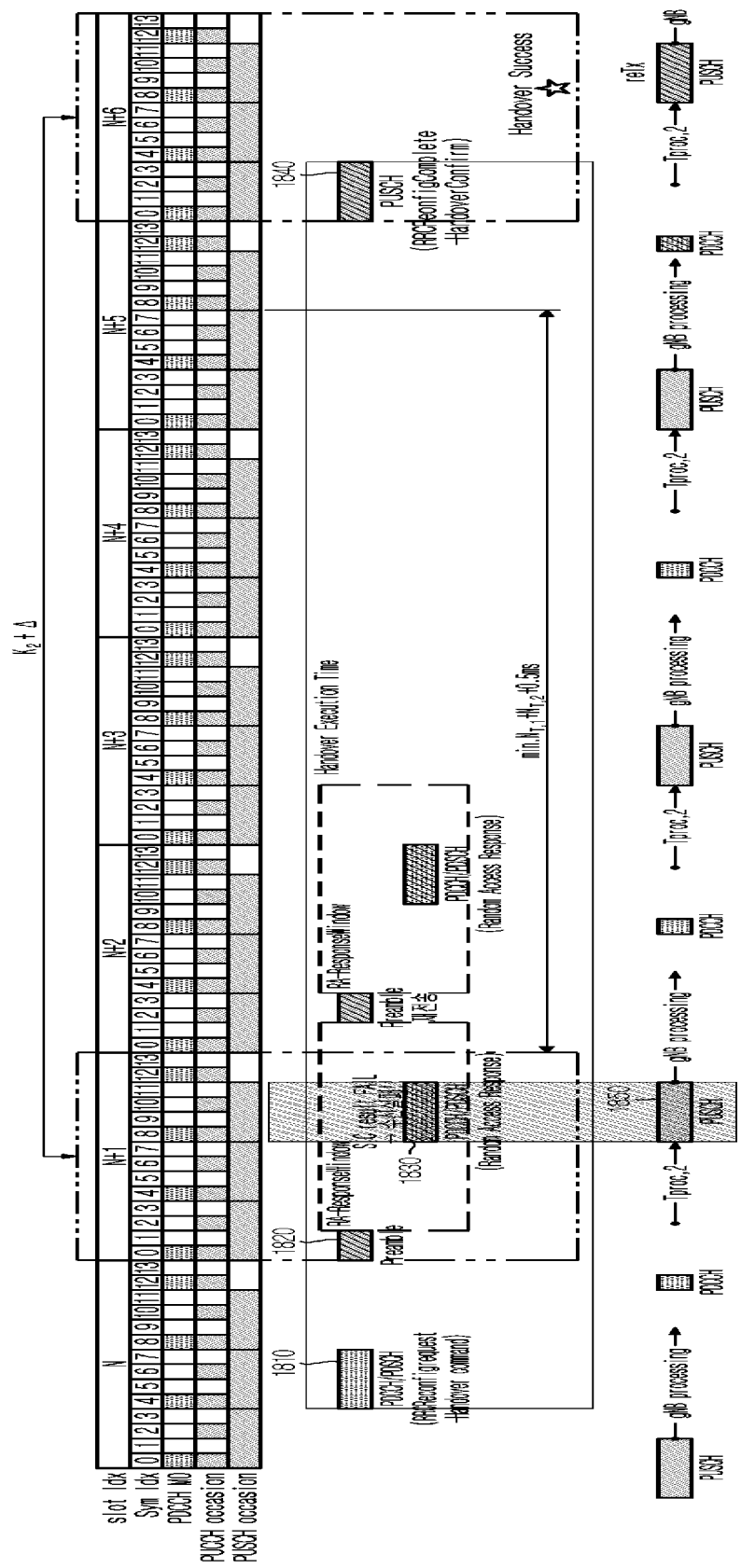
FIG. 18 is a view showing a case of down link reception failure based on SIC failure according to an embodiment of the present disclosure.

As an example, a user device operating based on an FRD mode may perform self-interference cancellation (SIC), which is the same as described above. Herein, when SIC of the user device fails, down link reception failure may occur. FIG. 17 and FIG. 18 are views showing a case of down link reception failure based on SIC failure applicable to the present disclosure. Referring to FIG. 17, a user device may transmit data to a target base station, while receiving data from a source base station. As an example, the user device may transmit a preamble 1720, while performing a synchronization procedure with the target base station. At this time, a time resource of data 1750 transmitted by the source base station may overlap with the preamble 1720. Herein, the user device operating based on an FDR mode may receiving the overlapping time resource of the data 1750 transmitted from the source base station, which is the same as described above.

However, in case the user device does not receive a down link from the source base station because of SIC failure, retransmission may occur, and data latency may increase. In addition, referring to FIG. 18, when a user device operating based on an FDR mode transmits data 1850 to a source base station and receives PDCCH/PDSCH 1830 including a random access response (RAR) to a preamble 1820 from a target base station, the user device may fail to receive the RAR because of SIC failure. Accordingly, the user device may need to transmit the preamble 1820 again, and thus a handover execution time may increase.

Based on what is described above, when a user device operating based on an FDR mode performs DAPS handover, a handover procedure may consider SIC performance, and a method associated therewith will be described below.

As a concrete example, a user device operating based on an FDR mode may operate a physical channel resource by operating in a half duplex radio (HDR) mode during a handover execution time and thus remove the above-described effect, which will be described below.

As yet another example, as a handover execution time is reduced only when a user device completes handover from a source base station to a target base station, a method of improving performance by preferring reception and transmission with the target base station may be necessary in a user device operating in an FDR mode. As an example, when a user device transmits data to a source base station and receives data from a target base station, the user device may remove an effect of self-interference by canceling the transmission to the source base station. On the other hand, when the user device receives data from the source base station and transmits data to the target base station, the user device may retransmission to the source base station in case NACK occurs based on a cyclic redundancy check (CRC) because of SIC failure or bad channel quality, which will be described below.

In addition, as an example, when a user device transmits data to a source base station and receives data from a target base station, if the user device transmits feedback on the received data to the target base station, the user device may also provide SIC result information together. As an example, when SIC failure occurs, the target base station may request a UL configuration change to the source base station so that transmission power may be lowered or a UL resource may be reallocated. The source base station may request uplink data to the user device by reflecting information received from the target base station. In addition, the target base station may increase power of down link data and transmit it to the user device again.

On the other hand, it is possible to consider a case in which a user device receives data from a source base station and transmits data to a target base station. In this case, when the user device transmits feedback on down link data to the source base station, the user device may also provide a SIC result together. As an example, the source base station may perform retransmission by reflecting DL resource re-allocation, which will be described below.

Figure 19:
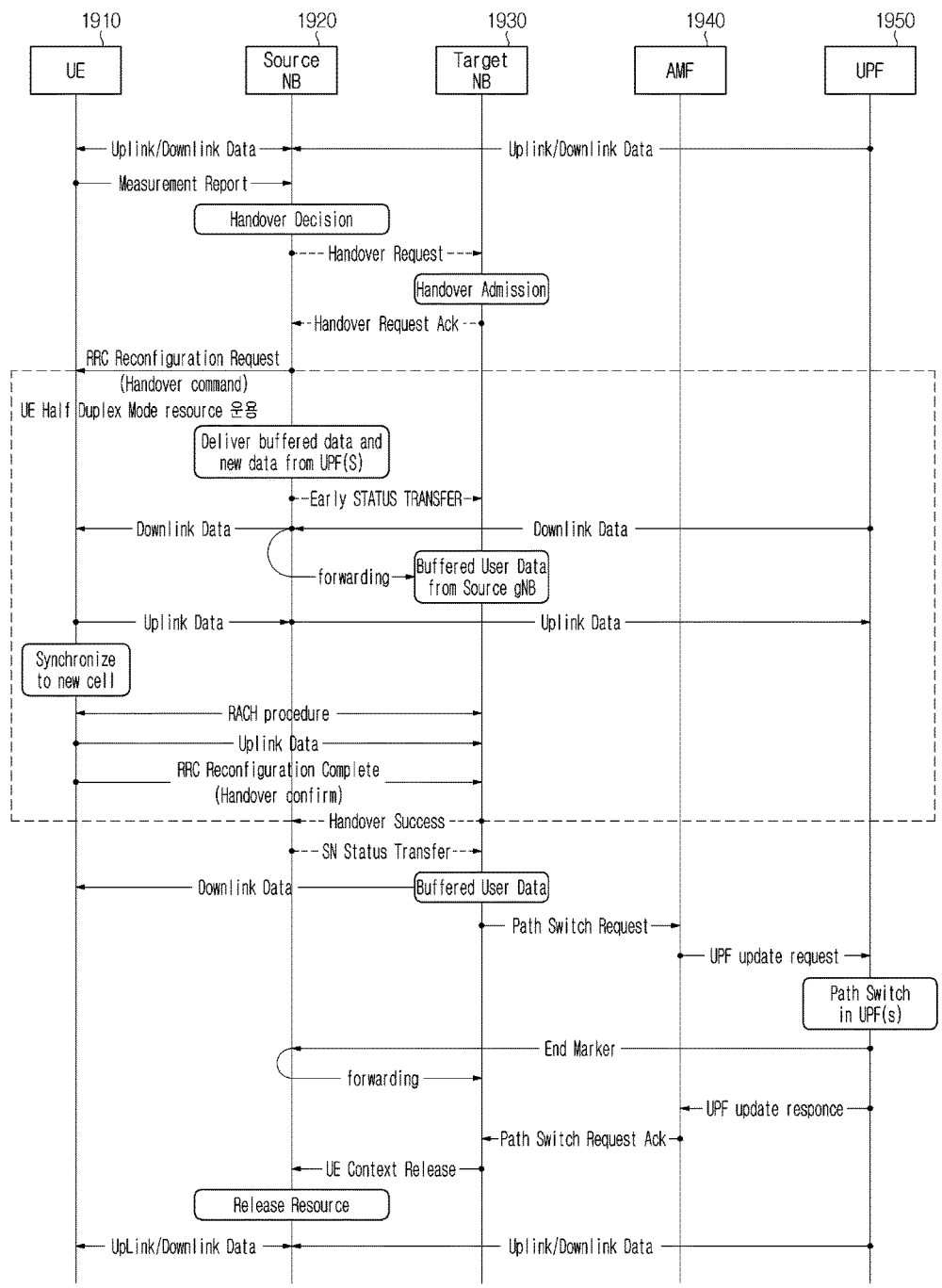
FIG. 19 is a view showing a method of switching a user device operating based on an FDR mode to a HDR mode in a handover procedure according to an embodiment of the present disclosure.

FIG. 19 is a view showing a method of switching a user device operating based on an FDR mode to a HDR mode in a handover procedure, which is applicable to the present disclosure.

Referring to FIG. 19, when a user device 1910 operating based on an FDR mode receives a RRC reconfiguration request including a handover command from a source base station 1920, the user device may operate a resource by switching to an HDR mode. Next, when the user device 1910 transmits a RRC reconfiguration complete including handover confirmation to a target base station 1930 and the target base station 1930 indicates handover success to the source base station 1920, the user device 1910 may perform resource allocation by switching from the HDR mode to the FDR mode.

When the user device 1910 receives a RRC reconfiguration request including a handover command from the source base station 1920, the user device may operate a resource by switching to the HDR mode. Next, the source base station 1920 may transmit an "EARLY SN STATUS" message to the target base station 1930. At this time, while transferring down link user data to the user device 1910, the source base station 1920 may simultaneously transfer data to the target base station 1930 together with an allocated SN status. As an example, since the user device 1910 operates based on the HDR mode as described above, it may have nothing to do with SIC failure. At this time, user data transferred to the target base station 1930 may be buffered. Next, when the user device 1910 completes a synchronization procedure with the target base station 1930, the user device 1910 may transmit a RRC reconfiguration complete including handover confirmation to the target base station 1930. In addition, the target base station 1930 may indicate handover success to the source base station 1920, and the user device 1910 may perform resource allocation by switching from the HDR mode to the FDR mode again.

Herein, as an example, the RRC reconfiguration request, which the user device 1910 receives from the source base station 1920, may include information indicating HDR mode or FDR mode as a resource control mode of the user device 1910, as shown in Table 5 below. However, this is merely one example, and the present disclosure is not limited to the above-described embodiment. That is, based on a RRC reconfiguration request message received from the source base station 1920, the user device 1910 may recognize operation in HDR mode and perform a corresponding operation. As an example, since the user device 1910 switches from the FDR mode to the HDR mode, self-interference may not need to be measured, and power consumption may be reduced.

TABLE 5

Figure 20:
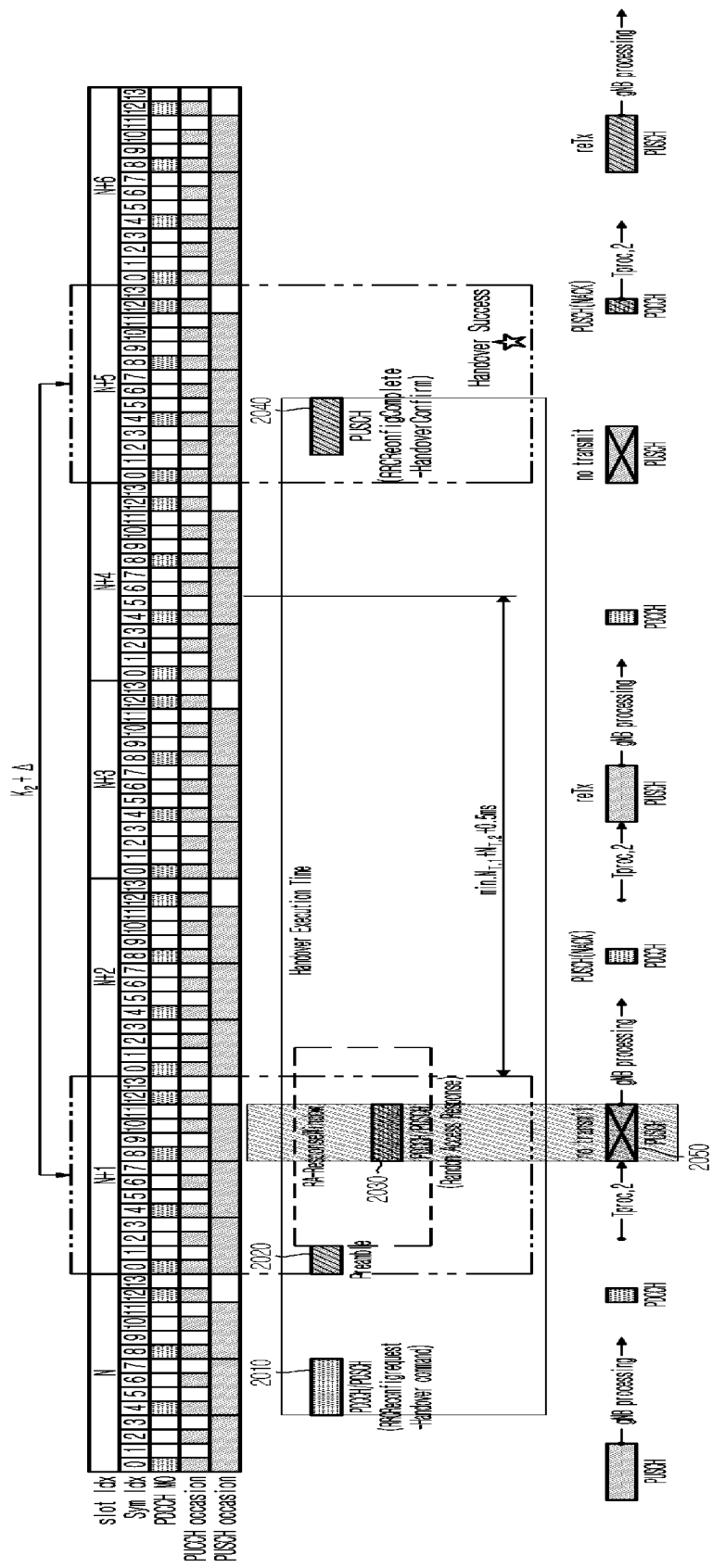
FIG. 20 is a view showing an operating method for a user device operating based on an FDR mode according to an embodiment of the present disclosure.
Figure 21:
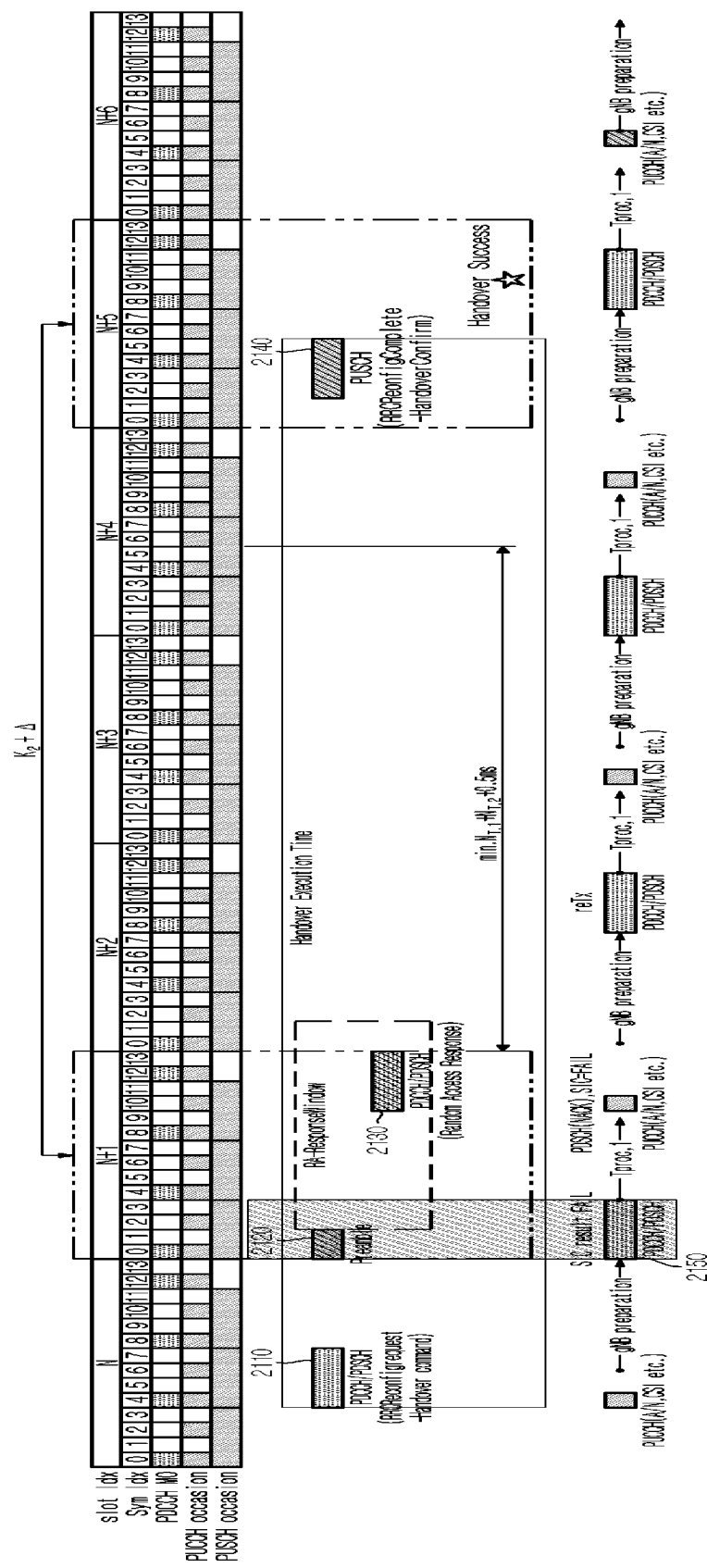
FIG. 21 is a view showing an operating method for a user device operating based on an FDR mode according to an embodiment of the present disclosure.

-- ASN1START
-- TAG-RRCRECONFIGURATION-START
RRCReconfiguration-DAPS-IEs :: = {
  UE_resource_control_mode Half_Duplex, Full_Duplex
-- TAG-RRCRECONFIGURATION-STOP
-- ASN1STOP As yet another example, a handover execution time may be determined based on completion of handover to a target base station. Accordingly, reception and transmission to the target base station may be important to reduce a handover execution time. Considering what is describe above, reception and transmission to the target base station may be preferred to reception and transmission to a source base station. FIG. 20 and FIG. 21 are views showing an operating method for a user device operating based on an FDR mode applicable to the present disclosure. Referring to FIG. 20, while implementing a synchronization procedure with a target base station, a user device operating based on an FDR mode may transmit a preamble 2020 and receive a RAR 2030. In addition, the user device may transmit data 2050 to the source base station. Herein, a time resource of the data 2050, which the user device transmits to the source base station, may overlap with a time resource of the RAR 2030 that the user device receives from the target base station. Herein, as an example, since the user device operates based on the FDR mode, the user device may perform transmission to the source base station and reception from the target base station at the same time. However, as described above, since the target base station is preferred, when there are data to be received from the target base station at a time when data are transmitted to the source base station, the user device may not perform transmission to the source base station. In this case, as the source base station does not receive an uplink from the user device at an expected time, it may request retransmission to the user device. That is, in order to make the target base station preferred, the user device may not perform transmission to the source base station but perform only reception from the target base station.

As yet another example, referring to FIG. 21, a user device operating based on an FDR mode may transmit a preamble 2120 to a target base station based on a synchronization procedure. In addition, the user device may receive data 2150 from a source base station. Herein, when a time resource of the data 2150, which the user device receives from the source base station, overlaps with a time resource of transmission of the preamble 2120, the user device may transmit the preamble 2120 to the target base station. That is, in case the user device performs reception from the source base station while performing transmission to the target base station, the user device may maintain transmission to the target base station. Herein, since the user device operates based on the FDR mode, the user device may perform data transmission to the target base station and data reception from the source base station at the same time. As an example, in case the user device fails SIC, the user device may not receive data from the source base station, but transmission data of the target base station may be saved, and thus reception and transmission to the target base station may be preferred. As yet another example, the user device may transmit a SIC result for received data to the source base station at an earliest uplink time or a feedback time specified by down link control information (DCI). As an example, when a SIC result is failure, the source base station may change a down link configuration and perform down link retransmission. Based on what is described above, when the user device receives data from the target base station, the user device may remove a self-interference effect irrespective of whether or not data are transmitted to the source base station. In addition, the user device may receive data from the source base station according to SIC performance of the user device, while maintaining data transmission to the target base station, and thus the target base station may be preferred.

Figure 22:
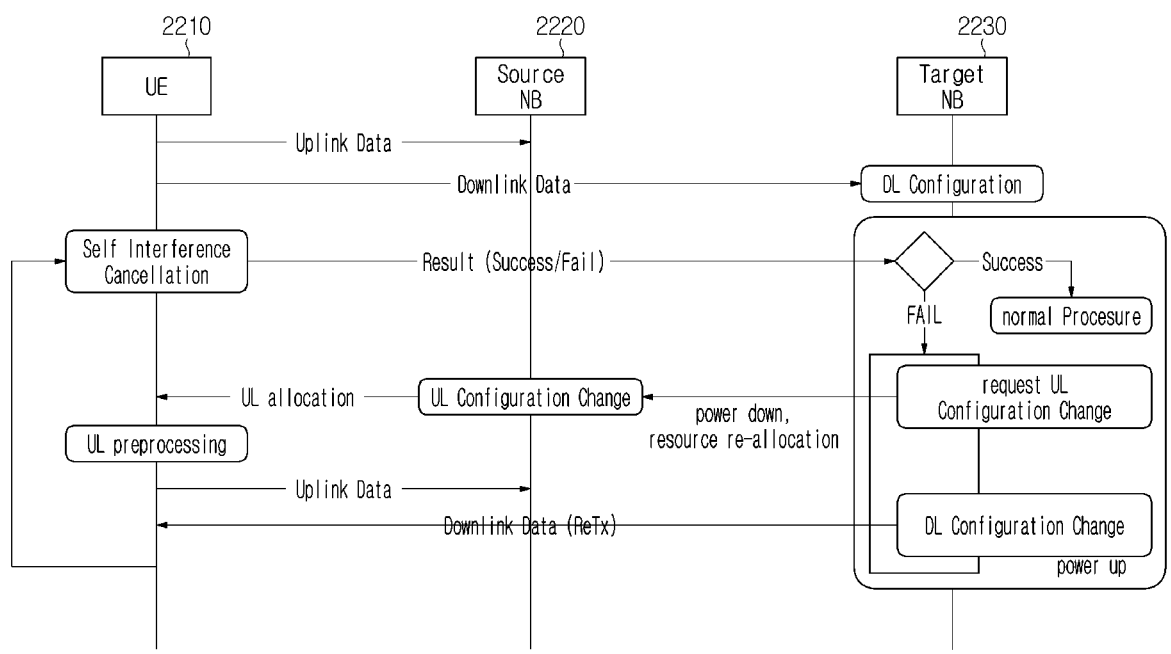
FIG. 22 is a view showing a method by which a user device operating based on an FDR mode maintains data transmission and reception with a source base station and a target base station according to an embodiment of the present disclosure.
Figure 23:
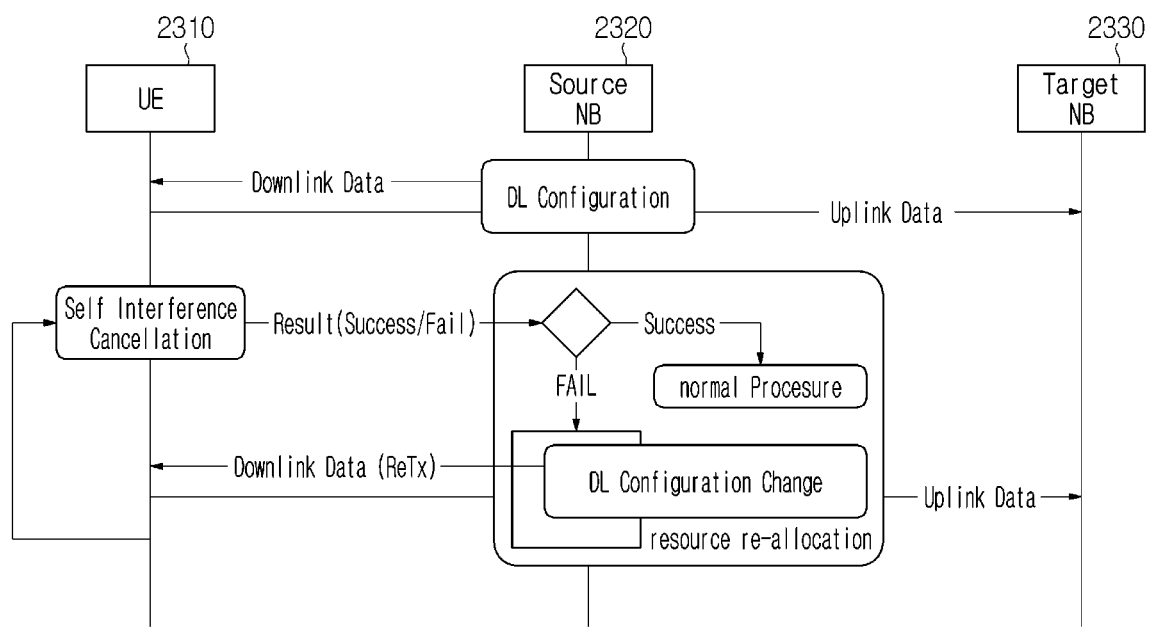
FIG. 23 is a view showing a method by which a user device operating based on an FDR mode maintains data transmission and reception with a source base station and a target base station according to an embodiment of the present disclosure.

FIG. 22 and FIG. 23 are views showing a method by which a user device operating based on an FDR mode, which is applicable to the present disclosure, maintains data transmission and reception with a source base station and a target base station. As an example, referring to FIG. 22, it is possible to consider a case in which a user device 2210 transmits data to a source base station 2220 and receives data from a target base station 2230. Herein, the user device 2210 may provide a SIC result for down link data to the target base station 2230 at an earliest uplink time. As another example, when the user device 2210 provides feedback to the target base station 2230 in a feedback section specified in DCI, the user device 2210 may provide SIC result information to the target base station 2230 together with the feedback information. Herein, in case SIC fails, the target base station 2230 may transmit an uplink configuration change request to the source base station 2220. As an example, the uplink configuration change request may include information indicating to lower transmission power. As yet another example, the uplink configuration change request may include information indicating resource reallocation but may not be limited to the above-described information. Next, the source base station 2220 may allocate an uplink resource to the user device 2210 based on the uplink configuration change request, and the user device 2210 may perform uplink transmission to the source base station 2220 based on the allocated resource. In addition, the target base station 2230 may change a down link configuration. As an example, based on a down link configuration change, the target base station 2230 may increase transmission power of down link data and perform retransmission to the user device 2210.

On the other hand, referring to FIG. 23, it is possible to consider a case in which a user device 2310 receives data from a source base station 2320 and transmits data to a target base station 2330. Herein, the user device 2310 may provide a SIC result for down link data to the source base station 2320 at an earliest uplink time. As another example, when the user device 2210 provides feedback to the source base station 2320 in a feedback section specified in DCI, the user device 2310 may provide SIC result information to the source base station 2320 together with the feedback information. Herein, in case SIC fails, the source base station 2320 may change a down link configuration. In this case, a down link resource may be reallocated based on a down link configuration change. Next, the source base station 2320 may perform down link retransmission. Herein, as an example, in consideration of uplink transmission to the target base station 2330, down link power control for enhancing reception performance may not be reflected, but the present disclosure may not be limited thereto.

Figure 24:
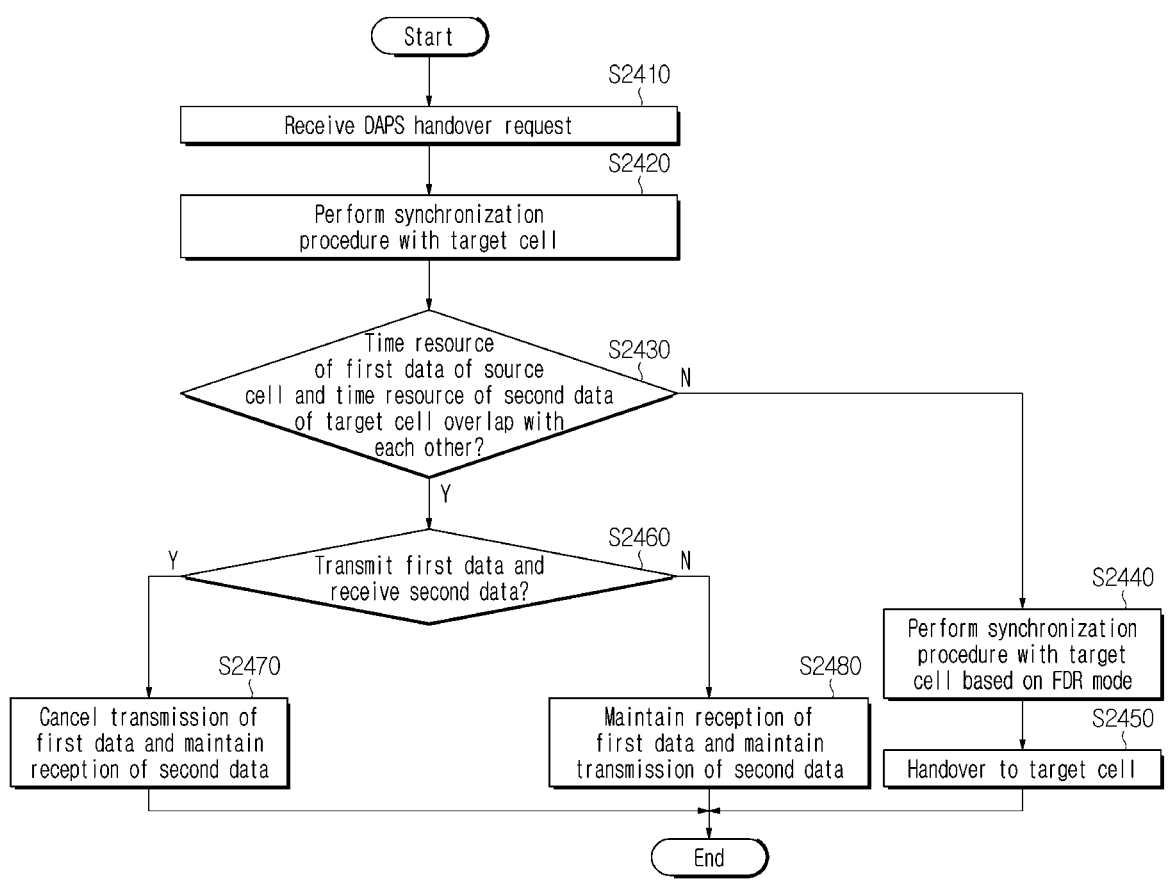
FIG. 24 is a view showing an operating method applicable to the present disclosure.

FIG. 24 is a view showing an operating method applicable to the present disclosure.

Referring to FIG. 24, as described in FIG. 1 to FIG. 23, a user device may operate based on an FDR mode. Herein, the user device may receive a DAPS handover request from a source cell (S2410). Next, the user device may perform a DAPS handover procedure. As an example, the user device may operate based on any one of FDR mode and HDR mode, which is the same as described above. Also, as an example, when the user device performs handover from a source cell to a target cell based on a DAPS handover procedure, the user device may maintain an enabled status for the source cell until it is connected to the target cell. Herein, the user device may perform a synchronization procedure with the target cell based on a DAPS handover request (S2420). Next, the user device may transmit a handover completion message to the target cell and complete handover to the target cell. Herein, as an example, while the DAPS handover procedure is performed, a time resource of first data of the source cell may overlap with a time resource of second data of the target cell. Herein, when there is no overlap of time resources (S2430), the user device may perform a synchronization procedure with the target cell based on an FDR mode (S2440) and complete handover to the target cell (S2450), which is the same as described above.

On the other hand, when the time resources overlap (S2430), if the first data for the source cell are data transmitted from the user device to the source cell and the second data for the target cell are data that the user device receives from the target cell (S2460), the user device may cancel transmission of the first data and maintain reception of the second data (S2470). That is, the user device may prefer data for the target cell, which is the same as described above.

In addition, when the time resources overlap (S2430), if the first data for the source cell are data that the user device receives from the source cell and the second data for the target cell are data that the user device transmits to the target cell (S2460), the user device may maintain reception of the first data and transmission of the second data (S2480). As an example, when SIC of a user device operating based on an FDR mode fails, only data reception of the user device fails but transmission is possible so that preference of a target cell may be maintained, which is the same as described above.

Figure 25:
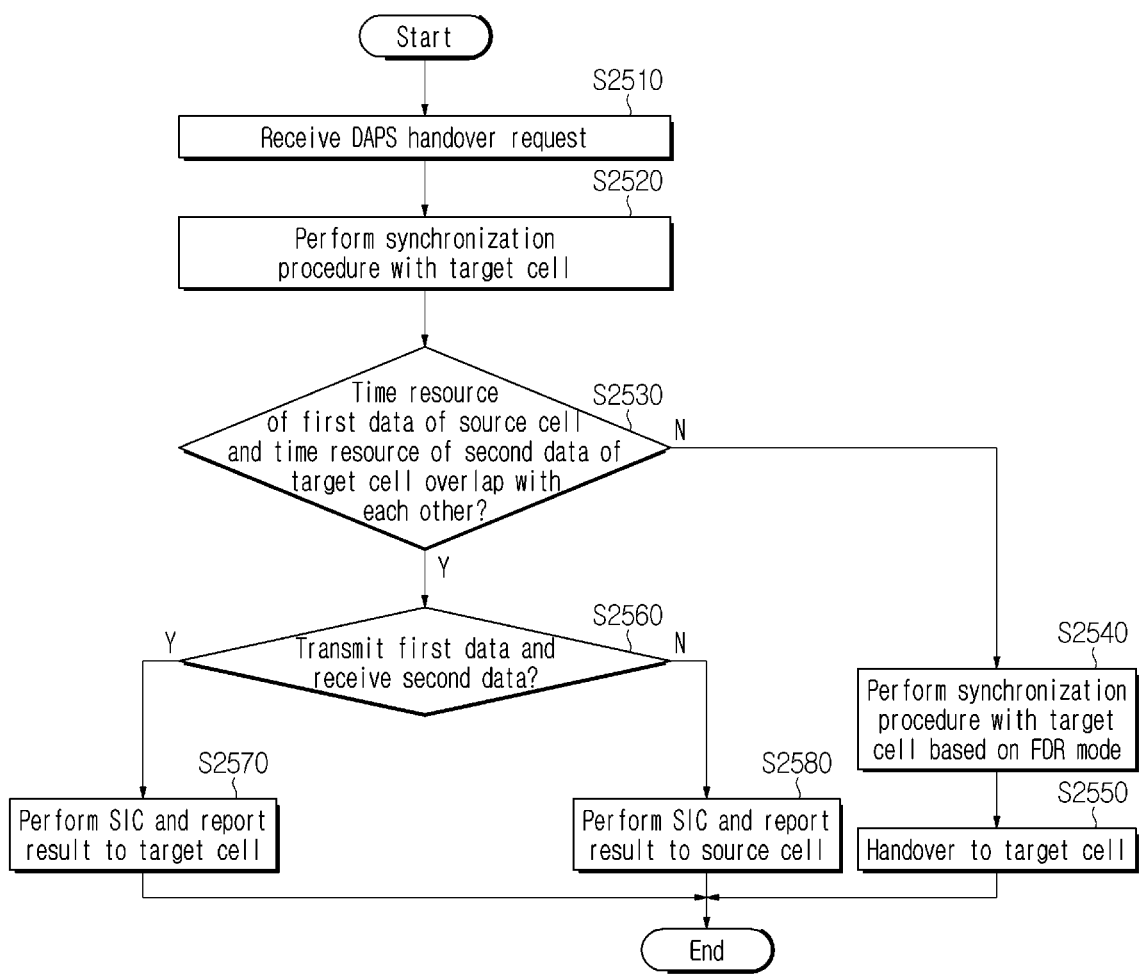
FIG. 25 is a view showing an operating method applicable to the present disclosure.

FIG. 25 is a view showing an operating method applicable to the present disclosure.

Referring to FIG. 25, as described in FIG. 1 to FIG. 23, a user device may operate based on an FDR mode. Herein, the user device may receive a DAPS handover request from a source cell (S2510). Next, the user device may perform a DAPS handover procedure. As an example, the user device may operate based on any one of FDR mode and HDR mode, which is the same as described above. Also, as an example, when the user device performs handover from a source cell to a target cell based on a DAPS handover procedure, the user device may maintain an enabled status for the source cell until it is connected to the target cell. Herein, the user device may perform a synchronization procedure with the target cell based on a DAPS handover request (S2520). Next, the user device may transmit a handover completion message to the target cell and complete handover to the target cell. Herein, as an example, while the DAPS handover procedure is performed, a time resource of first data of the source cell may overlap with a time resource of second data of the target cell. Herein, when there is no overlap of time resources (S2530), the user device may perform a synchronization procedure with the target cell based on an FDR mode (S2540) and complete handover to the target cell (S2550), which is the same as described above.

On the other hand, when the time resources overlap (S2530), if the first data for the source cell are data transmitted from the user device to the source cell and the second data for the target cell are data that the user device receives from the target cell (S2560), the user device may perform SIC based on transmission of the first data and reception of the second data and report an SIC result to the target cell (S2570). Herein, when the SIC fails based on an SIC result, the target cell may transmit an uplink configuration change request to the source cell, the source cell may transmit uplink information on transmission of the first data based on the uplink configuration change request to the user device. In addition, the target cell may increase transmission power for the second data and retransmit the second data to the user device, which is the same as described above.

In addition, when the time resources overlap (S2530), if the first data for the source cell are data that the user device receives from the source cell and the second data for the target cell are data that the user device transmits to the target cell (S2560), the user device may perform SIC based on reception of the first data and transmission of the second data and report an SIC result to the source cell (S2580). In this case, when the SIC is failure based on an SIC result, the source cell may change a down link configuration and retransmit the first data, which is the same as described above.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 26:
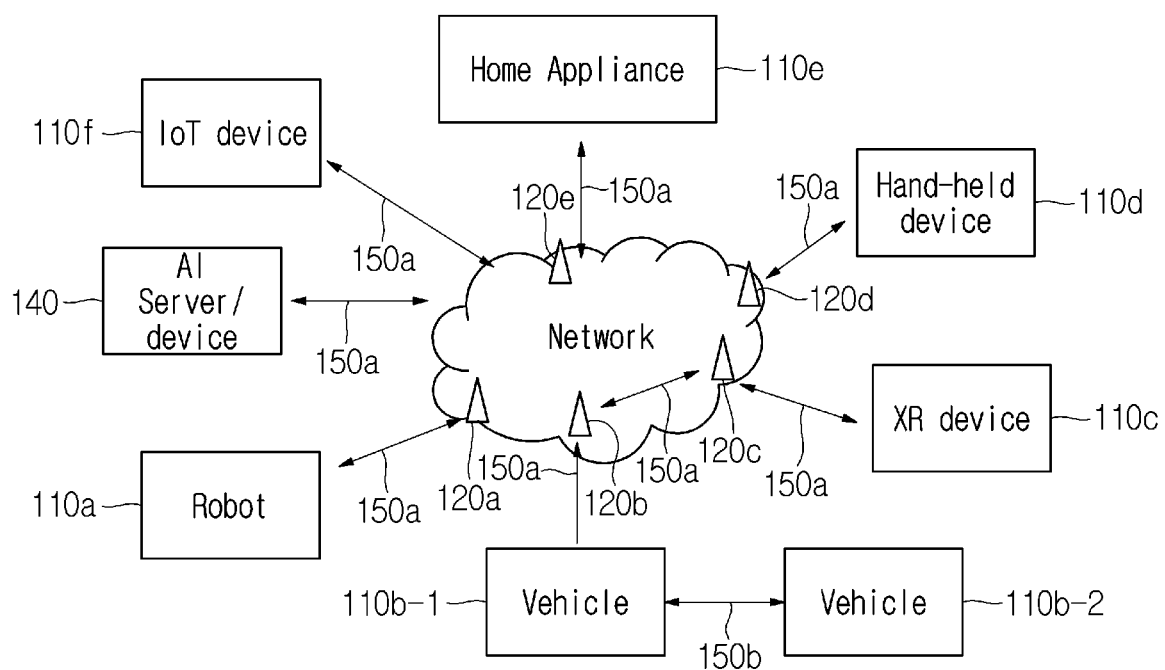
FIG. 26 illustrates an example of a communication system according to an embodiment of the present disclosure.

FIG. 26 illustrates an example of a communication system according to an embodiment of the present disclosure. The embodiment of FIG. 26 may be combined with various embodiments of the present disclosure.

Referring to FIG. 26, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110a, vehicles 110b-1 and 110b-2, an extended reality (XR) device 110c, a hand-held device 110d, a home appliance 110e, an Internet of Thing (IoT) device 110f or an artificial intelligence (AI) device/server 110g. For example, the vehicle may include a vehicle having a wireless communication function, an autonomous vehicle, a vehicle capable of performing vehicle-to-vehicle communication or the like. Here, the vehicles 110b-1 and 110b-2 may include an unmanned aerial vehicle (UAV) (e.g., drone). The XR device 110c may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110d may include a smartphone, a smart pad, a wearable device (e.g., a smartwatch or smart glasses), a computer (e.g., a laptop, etc.), etc. The home appliance 110e may include a TV, a refrigerator, a washing machine, etc. The IoT device 110f may include a sensor, a smart meter, etc. For example, the base stations 120a to 120e and the network may be implemented by a wireless device, and the specific wireless device 120a may operate as a base station/network node for the other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110a to 110f of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110a to 110f of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (IAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 27:
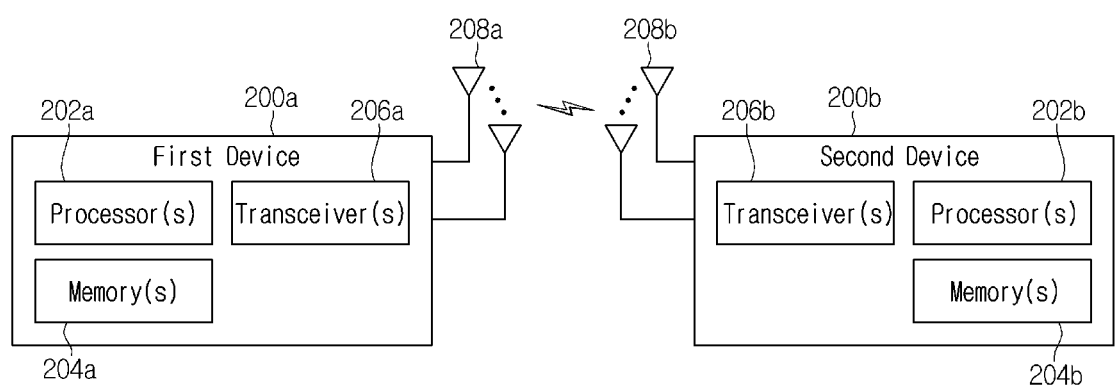
FIG. 27 illustrates an example of a wireless device according to an embodiment of the present disclosure.

FIG. 27 illustrates an example of a wireless device according to an embodiment of the present disclosure.

Referring to FIG. 27, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a. The memory 204a may be connected to the processor 202a to store a variety of information related to operation of the processor 202a. For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 28:
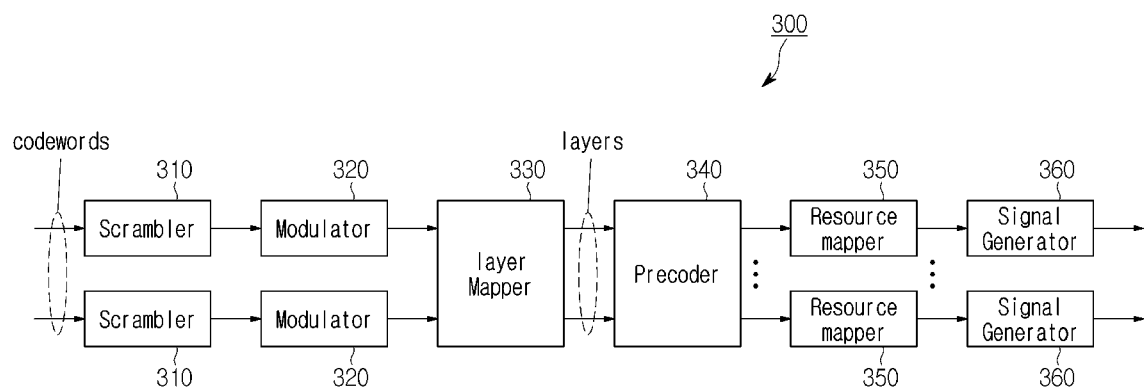
FIG. 28 illustrates a circuit of processing a transmission signal according to an embodiment of the present disclosure.

FIG. 28 illustrates a circuit for processing a transmitted signal according to an embodiment of the present disclosure. The embodiment of FIG. 28 may be combined with various embodiments of the present disclosure.

Referring to FIG. 28, a signal processing circuit 300 may include a scrambler 310, a modulator 320, a layer mapper 330, a precoder 340, a resource mapper 350 and a signal generator 360. In this case, for example, the operation/function of FIG. 28 may be performed by the processors 202a and 202b and/or the transceivers 206a and 206b of FIG. 27. In addition, for example, the hardware element of FIG. 28 may be implemented in the processors 202a and 202b and/or the transceivers 206a and 206b of FIG. 27. For example, blocks 310 to 360 may be implemented in the processors 202a and 202b of FIG. 27. Alternatively, the blocks 310 to 350 may be implemented in the processors 202a and 202b of FIG. 27 and the block 360 may be implemented in the transceivers 206a and 206b of FIG. 27, without being limited to the above-described embodiment.

The codeword may be converted into a radio signal through the signal processing circuit 300 of FIG. 28. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 28. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK (pi/2-binary phase shift keying), m-PSK (m-phase shift keying), m-QAM (m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT)) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 28. For example, the wireless device (e.g., 200a and 200b of FIG. 27) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a de-scrambler and a decoder.

Figure 29:
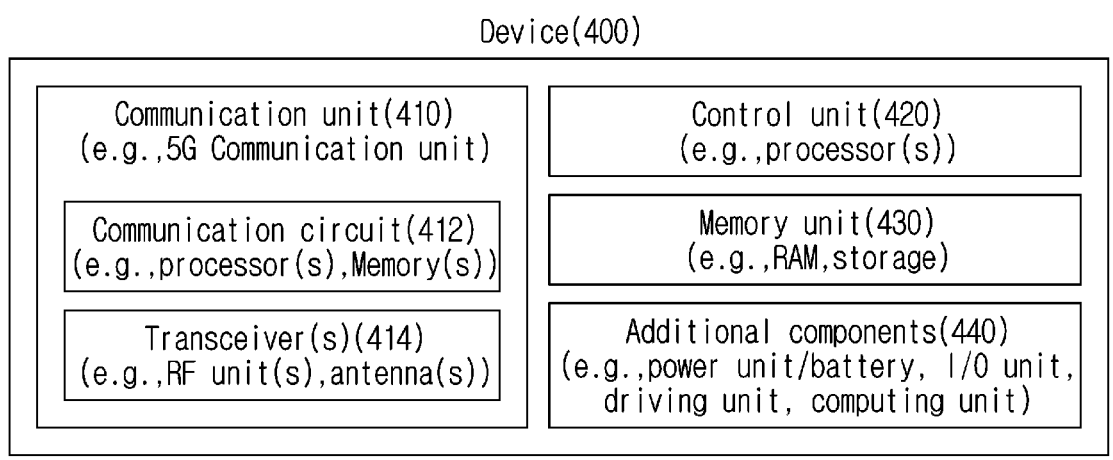
FIG. 29 illustrates another example of a wireless device according to an embodiment of the present disclosure.

FIG. 29 illustrates another example of a wireless device according to an embodiment of the present disclosure. The embodiment of FIG. 29 may be combined with various embodiments of the present disclosure.

Referring to FIG. 29, the wireless device 300 corresponds to the wireless devices 200a and 200b of FIG. 27 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202a and 202b and/or the one or more memories 204a and 204b of FIG. 27. For example, the transceiver(s) 414 may include the one or more transceivers 206a and 206b and/or the one or more antennas 208a and 208b of FIG. 27.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/ mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110a), a vehicle (FIG. 1, 110b-1 and 110b-2), an XR device (FIG. 1, 110c), a hand-held device (FIG. 1, 110d), a home appliance (FIG. 1, 110e), an IoT device (FIG. 1, 1100, a digital broadcast user device, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 30:
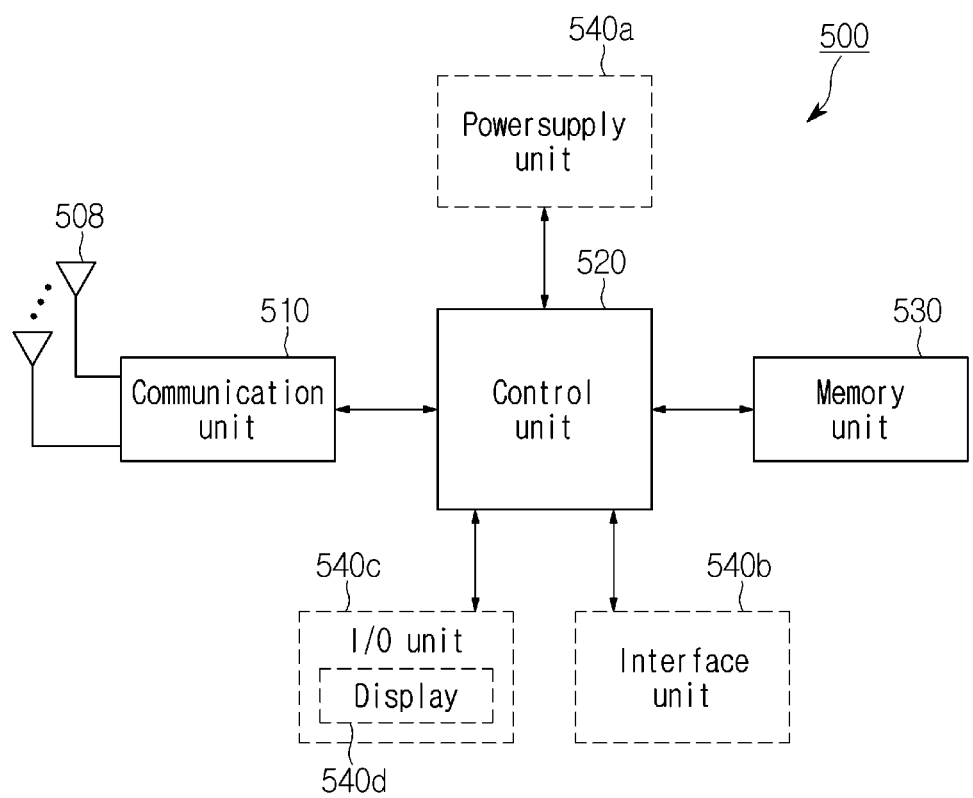
FIG. 30 illustrates an example of a hand-held device according to an embodiment of the present disclosure.

FIG. 30 illustrates an example of a hand-held device according to an embodiment of the present disclosure. FIG. 30 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 30 may be combined with various embodiments of the present disclosure.

Referring to FIG. 30, the hand-held device 500 may include an antenna unit 508, a communication unit 510, a control unit 530, a power supply unit 540a, an interface unit 540b and an input/output unit 540c. The antenna unit 508 may be a portion of the communication unit 510. Blocks 510 to 530/540a to 540c may respectively correspond to the blocks 410 to 430/440 of FIG. and a repeated description thereof will be omitted.

The communication unit 510 may transmit and receive signals, the control unit 520 may control the hand-held device 500, and the memory unit 530 may store data, etc. The power supply unit 540a may supply power to the hand-held device 500 and include a wired/wireless charging circuit, a battery, etc. The interface unit 540b may support connection between the hand-held device 500 and another external device. The interface unit 540b may include various ports (e.g., an audio input/output port and a video input/output port) for connection with the external device. The input/output unit 540c may receive or output image video information/signals, audio information/signals, data and/or information received from a user. The input/output unit 540c may include a camera, a microphone, a user input unit, a display 540d, a speaker and/or a haptic module.

For example, in the case of data communication, the input/output unit 540c may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 31:
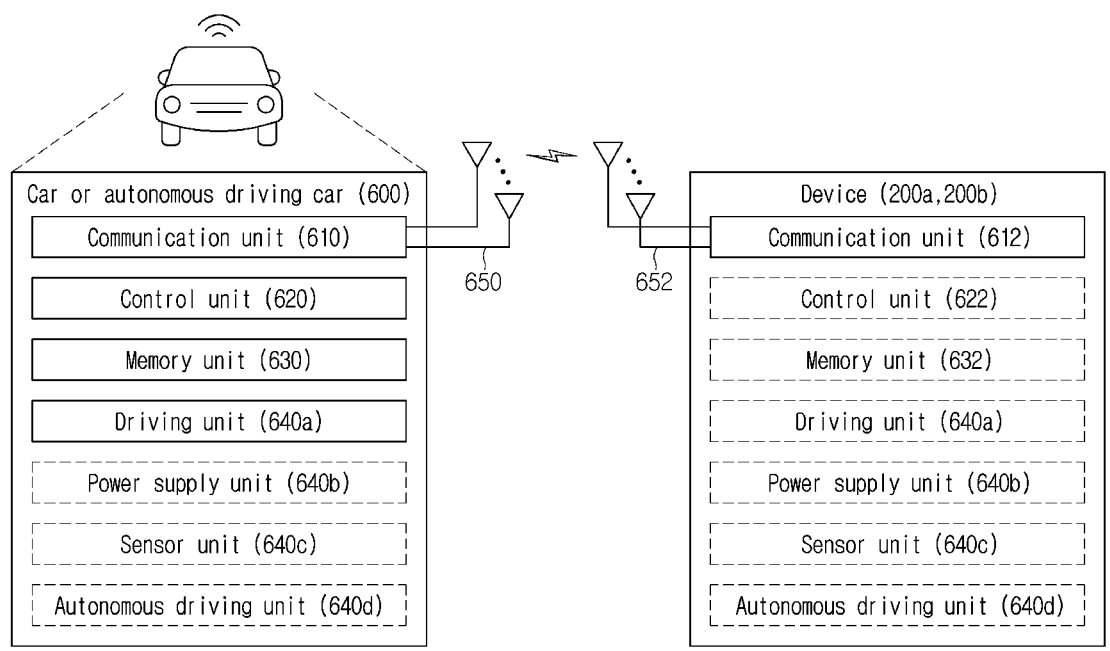
FIG. 31 illustrates an example of a vehicle or an autonomous vehicle according to an embodiment of the present disclosure.

FIG. 31 illustrates an example of a vehicle or an autonomous vehicle according to an embodiment of the present disclosure. FIG. 31 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 31 may be combined with various embodiments of the present disclosure.

Referring to FIG. 31, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a-640d correspond to the blocks 510/530/540 of FIG. 30, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640a may cause the vehicle or the autonomous vehicle 600 to drive on a road. The driving unit 640a may include an engine, a motor, a powertrain, a wheel, a brake, a steering device, etc. The power supply unit 640b may supply power to the vehicle or the autonomous vehicle 600 and include a wired/wireless charging circuit, a battery, etc. The sensor unit 640c may obtain a vehicle state, ambient environment information, user information, etc. The sensor unit 640c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:

1. A handover method for a user device in a wireless communication system, the handover method comprising:
    receiving, by the user device operating based on a full duplex radio (FDR) mode, a dual active protocol stack (DAPS) handover request;
    performing a synchronization procedure with a target cell based on the DAPS handover request;
    transmitting a handover completion message to the target cell; and
    being connected to the target cell,
    wherein the user device operates based on at least one of the FDR mode and a half duplex radio (HDR) mode,
    wherein, based on a DAPS handover procedure that the user device performs for handover from a source cell to the target cell, the user device maintains an enabled status for the source cell until the user device is connected to the target cell, and
    wherein, in case that the user device transmits first data to the source cell and receives second data from the target cell during the DAPS handover procedure, based on an overlap being present between a time resource of the first data transmitted to the source cell and a time resource of the second data received from the target cell, the user device performs a self interference cancellation (SIC) based on transmission of the first data and reception of the second data and feeds an SIC result back to the target cell.

2. The handover method of claim 1, wherein, in case that the user device operates based on the FDR mode, the user device is switched to the HDR mode, while the DAPS handover procedure is performed, and is switched to the FDR mode again after being completely connected to the target cell.

3. The handover method of claim 2, wherein the user device is switched from the FDR mode to the HDR mode based on receiving a RRC reconfiguration request message including a handover command, and
    wherein the user device is switched from the HDR mode to the FDR mode based on the user device transmitting a RRC reconfiguration completion message including handover completion to the target cell and the target cell transmitting a handover success message to the source cell.

4. The handover method of claim 1, wherein, in case that the user device receives first data from the source cell and transmits second data to the target cell during the DAPS handover procedure, based on an overlap being present between a time resource of the first data received from the source cell and a time resource of the second data transmitted to the target cell, the user device maintains reception of the first data and transmission of the second data.

5. The handover method of claim 4, wherein the user device performs self interference cancellation (SIC) based on the reception of the first data and the transmission of the second data based on the FDR mode and transmits an SIC result to the source cell.

6. The handover method of claim 5, wherein, in case that the SIC of the user device is failure based on the SIC result, the source cell changes a down link configuration for first data and retransmits the first data to the user device based on the changed down link configuration.

7. The handover method of claim 1, wherein, in case that the SIC is failure based on the SIC result, the target cell transmits an uplink configuration change request to the source cell, and the source cell transmits uplink information on the transmission of the first data to a user device based on the uplink configuration change request, and
    wherein the target cell performs retransmission to the user device by increasing transmission power for the second data.

8. The handover method of claim 1, wherein, in case that the user device receives first data from the source cell and transmits second data to the target cell during the DAPS handover procedure, based on an overlap being present between a time resource of the first data received from the source cell and a time resource of the second data transmitted to the target cell, the user device performs SIC based on reception of the first data and transmission of the second data and feeds an SIC result back to the source cell.

9. The handover method of claim 8, wherein, in case that the SIC is failure based on the SIC result, the source cell changes a down link configuration and retransmits the first data.

10. A user device for performing handover in a wireless communication system, the user device comprising:
   a transceiver; and
   a processor coupled with the transceiver,
   wherein the processor is configured to:
   control the transceiver to receive a dual active protocol stack (DAPS) handover request,
   perform a synchronization procedure with a target cell based on the DAPS handover request,
   control the transceiver to transmit a handover completion message to the target cell, and be connected to the target cell, and
   wherein the user device operates based on a full duplex radio (FDR) mode,
   wherein the user device operates based on at least one of the FDR mode and a half duplex radio (HDR) mode,
   wherein, based on a DAPS handover procedure that the user device performs for handover from a source cell to the target cell, the user device maintains an enabled status for the source cell until the user device is connected to the target cell, and
   wherein, in case that the user device transmits first data to the source cell and receives second data from the target cell during the DAPS handover procedure, based on an overlap being present between a time resource of the first data transmitted to the source cell and a time resource of the second data received from the target cell, the user device performs a self interference cancellation (SIC) based on transmission of the first data and reception of the second data and feeds an SIC result back to the target cell.

11. A method for performing, by a base station, handover of a user device in a wireless communication system, the method comprising:
   transmitting a dual active protocol stack (DAPS) handover request to the user device operating based on a full duplex radio (FDR) mode;
   forwarding buffered data of the user device to a target cell based on the DAPS handover request; and
   receiving a handover success message from the target cell,
   wherein the user device operates based on at least one of the FDR mode and a half duplex radio (HDR) mode,
   wherein, based on a DAPS handover procedure that the user device performs for handover from a source cell to the target cell, the user device maintains an enabled status for the source cell until the user device is connected to the target cell, and
   wherein, in case that the user device transmits first data to the source cell and receives second data from the target cell during the DAPS handover procedure, based on an overlap being present between a time resource of the first data transmitted to the source cell and a time resource of the second data received from the target cell, the user device performs a self interference cancellation (SIC) based on transmission of the first data and reception of the second data and feeds an SIC result back to the target cell.

* * * * *